United States Patent
McCloud et al.

(10) Patent No.: US 8,923,424 B2
(45) Date of Patent: Dec. 30, 2014

(54) MULTI-TERM DEMAPPING FOR MULTI-CHANNEL WIRELESS COMMUNICATION

(75) Inventors: Michael L. McCloud, San Diego, CA (US); Matthias Brehler, Boulder, CO (US); Ju Won Park, San Ramon, CA (US); Jong Hyeon Park, San Jose, CA (US); Je Woo Kim, Cupertino, CA (US); Inyup Kang, San Diego, CA (US); Brian C. Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 716 days.

(21) Appl. No.: 12/711,128

(22) Filed: Feb. 23, 2010

(65) Prior Publication Data

US 2011/0206151 A1 Aug. 25, 2011

(51) Int. Cl.
*H04B 7/02* (2006.01)
*H04L 25/03* (2006.01)
*H04B 7/04* (2006.01)

(52) U.S. Cl.
CPC ... *H04L 25/03229* (2013.01); *H04L 2025/0342* (2013.01); *H04L 25/03318* (2013.01); *H04L 2025/03426* (2013.01); *H04L 25/03242* (2013.01); *H04B 7/0413* (2013.01)
USPC ........... 375/267; 375/260; 375/262; 375/299; 375/349

(58) Field of Classification Search
USPC ............................ 375/267, 260, 262, 299, 349
See application file for complete search history.

(56) References Cited

U.S. PATENT DOCUMENTS

| | | | |
|---|---|---|---|
| 2008/0130775 A1* | 6/2008 | Hum et al. ..................... | 375/262 |
| 2010/0246656 A1* | 9/2010 | Hammerschmidt .......... | 375/229 |
| 2010/0278225 A1* | 11/2010 | Chun et al. ..................... | 375/224 |

FOREIGN PATENT DOCUMENTS

| | | |
|---|---|---|
| EP | 1411693 A2 | 4/2004 |
| WO | WO2007062021 | 5/2007 |

OTHER PUBLICATIONS

Ibing A et al: "On the Relation of MIMO APP Detection and SIMO Maximum Ratio Combining" Global Tele Communications Conference, 2009. GLOBECOM 2009. IEEE, IEEE, Piscataway, NJ, USA, Nov. 30, 2009, pp. 1-6, XP031645742, ISBN: 978-1-4244-4148-8 Section 111. SIMO maximum ratio combining as special case o f MIMO APP and Max-Log-APP detection.
International Search Report and Written Opinion—PCT/US2011/025552—ISA/EPO—Aug. 30, 2011.
Taiwan Search Report—TW100105287—TIPO—Jul. 31, 2013.

\* cited by examiner

*Primary Examiner* — Kabir A Timory
(74) *Attorney, Agent, or Firm* — François A. Pelaez

(57) ABSTRACT

Providing for reduced complexity or improved accuracy in de-mapping received wireless data streams for multi-channel wireless communication is described herein. By way of example, a low-complexity likelihood algorithm can be employed to de-map data bits from the wireless data streams. In one particular example, the likelihood algorithm can approximate a received bit with a subset of received wireless symbols correlated the bit, reducing algorithm complexity. In other examples, a limited set of received wireless symbols can be employed for the subset, further reducing algorithm complexity. According to at least one other example, logarithmic terms of the algorithm can be approximated with non-logarithmic functions, such as a look-up table, series expansion, polynomial approximation, or the like. These approximations can enhance symbol de-mapping accuracy while maintaining or improving processing overhead for a wireless receiver.

23 Claims, 13 Drawing Sheets

MULTI-TERM DEMAPPING FOR MULTI-CHANNEL WIRELESS COMMUNICATION

BACKGROUND

1. Field

The following description relates generally to wireless communications, and more particularly to facilitating improved accuracy and reduced complexity for signal demodulation in multi-channel wireless communication.

2. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can also be referred to as spatial channels, wireless channels, wireless links, or a similar terminology, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

In addition, mobile devices can communicate with other mobile devices (and/or base stations with other base stations) in peer-to-peer wireless network configurations. These peer-to-peer wireless network configurations can enable multi-user MIMO communications, where a set of mobile devices, wireless relays, wireless repeaters, and so forth coordinate to receive data from, or transmit data to, a network via multiple antennas of the respective devices. Likewise, groups of base stations can also coordinate multiple antennas at respective base stations to transmit a stream of data to, or receive a stream of data from, one or more of the mobile devices.

While MIMO communication can lead to enhanced wireless performance, several complexities result that can reduce efficacy of such communication. As one example, conventional wireless interference and noise based on signal scattering, signal interference, signal reflections and so on can be compounded for MIMO communication. As another example, employing multiple antennas to transmit or receive a data stream can require additional processing and memory overhead for a transmit-receive chain. For instance, a MIMO system based on two transmitters and two receivers involves up to four separate spatial channels and four corresponding signal dimensions. Each bit transmitted from transmitter to receiver is therefore represented by as many as four times the wireless symbols as conventional communication. Demodulation components that de-map bits by analyzing received symbols associated with a bit can observe exponential increases in processing complexity, resulting in unmanageable processing. Accordingly, mechanisms for improving wireless signal demodulation can help to realize some of the great advantages of MIMO communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for reduced complexity in de-mapping received wireless data streams for multi-channel wireless communication. As an example, a low-complexity likelihood algorithm can be employed to de-map data bits from the wireless data streams. As a particular example, the likelihood algorithm can approximate a summation of a set of likelihood values representing a bit with a subset of likelihood values that have high probability of matching the bit. In some aspects of the subject disclosure, selecting the subset of likelihood values can be further simplified by establishing a constant likelihood value for wireless symbols obtained from one or more of the wireless data streams. This can effectively reduce analysis overhead in selecting the subset of likelihood values. According to one or more other aspects of the subject disclosure, the likelihood algorithm can be simplified by approximating logarithmic terms with non-logarithmic functions, such as a look-up table, series expansion, polynomial approximation, or the like. This can be useful for terms comprising a logarithm of a sum, for instance, to avoid processing overhead involved in calculating the logarithm. Accordingly, complexities associated in de-mapping the received wireless data streams are significantly reduced. Furthermore, accuracy of the de-mapping is enhanced over conventional methods, resulting in improved transmit-receive correlation at substantially similar or reduced processing times.

In another aspect of the subject disclosure, provided is a method for multiple input multiple output (MIMO) wireless communication. The method can comprise employing at least one wireless receiver to obtain multiple data streams via multiple wireless links. Moreover, the method can comprise employing a data processor to de-map a bit of the multiple data streams by executing a likelihood algorithm, wherein the likelihood algorithm approximates the bit with a plurality of bit-estimates derived from a subset of the multiple data streams that have high probability of matching the bit. In addition to the foregoing, the method can also comprise employing the data processor to output an approximation of the bit as a de-mapped bit.

In yet another aspect an apparatus is provided for multi-channel wireless communication. The apparatus can comprise at least one wireless receiver that obtains multiple wireless data streams from multiple wireless channels. Further, the apparatus can comprise at least one processor for executing a set of modules configured to implement the multichannel wireless communication. Specifically, the set of modules can comprise an operation module that employs a probabilistic algorithm to transform a set of symbols sampled from the multiple wireless data streams into a bit and a reduction module that simplifies the probabilistic algorithm by approximating a sum of the set of symbols with a subset of the set of symbols that are closely correlated with the bit, wherein the subset comprises at least two but less than all of the set of symbols. Moreover, the apparatus can comprise memory for storing the set of modules.

According to still other aspects, disclosed is an apparatus for wireless communication. The apparatus can comprise means for employing one or more wireless receivers to acquire wireless data from multiple wireless channels. Further, the apparatus can comprise means for employing at least one processor for analyzing the wireless data to extract a bit from the wireless data. Moreover, the apparatus can comprise means for employing the at least one processor to simplify the analyzing by substituting a plurality of bit-probabilities derived from the wireless data for a summation of a set of bit-probabilities associated with the bit, wherein the plurality of bit-probabilities is less than all bit-probabilities associated with the bit.

Another aspect of the disclosure provides at least one processor configured for wireless communication. The at least one processor can comprise a module for acquiring wireless data from multiple wireless channels and a module for analyzing the wireless data to extract a bit from the wireless data. Furthermore, the at least one processor can comprise a module for simplifying the analyzing by substituting a plurality of bit-probabilities derived from the wireless data for a summation of a set of bit-probabilities associated with the bit, wherein the plurality of bit-probabilities is less than all bit-probabilities associated with the bit.

Further to the above, the subject disclosure provides a computer program product comprising a computer-readable medium. The computer-readable medium can comprise a first set of code for causing a computer to acquire wireless data from multiple wireless channels. Moreover, the computer-readable medium can comprise a second set of code for causing the computer to analyze the wireless data to extract a bit from the wireless data. Additionally, the computer-program product can comprise a third set of code for causing the computer to simplify the analyzing by substituting a plurality of bit-probabilities derived from the wireless data for a summation of a set of bit-probabilities associated with the bit, wherein the plurality of bit-probabilities is less than all bit-probabilities associated with the bit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
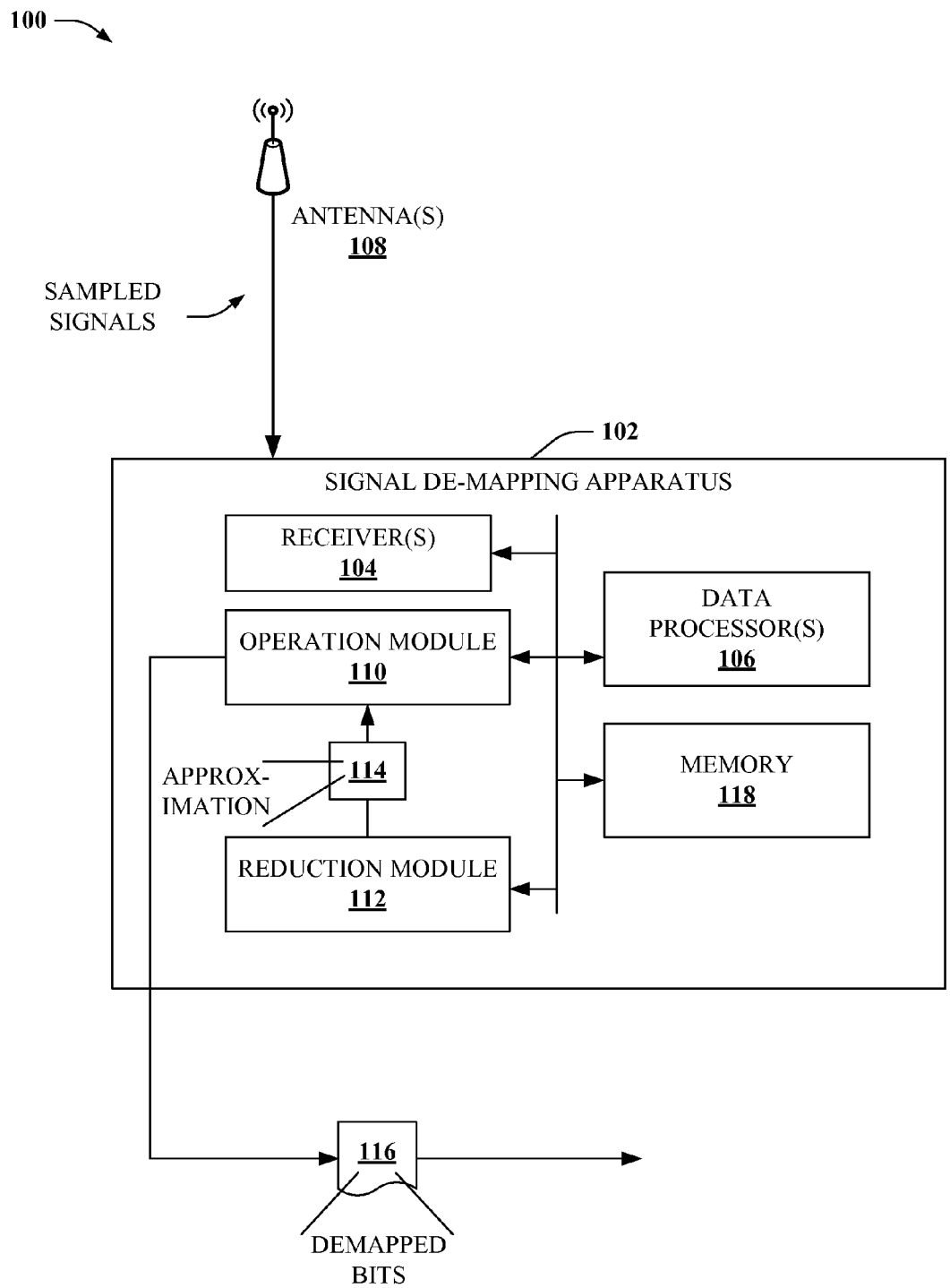
FIG. 1 depicts a block diagram of an example signal de-mapping apparatus according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing improved signal de-mapping in a multi-channel wireless communication environment (e.g., a multiple-input multiple-output MIMO environment). One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. But each case depends on establishing a wireless link between a transmitter of the wireless node and a receiver of the local infrastructure or base station, and vice versa. Typically, the wireless link involves a transmitter-receiver pair coordinating a set of orthogonal wireless resources (e.g., frequency subband, time subslot, code-spread factor, and so on), employed by the wireless node and local infrastructure. By transmitting or decoding signals only on the set of orthogonal wireless resources, data transmitted on one wireless link (set of resources employed by a transmitter-receiver pair) can be distinguished from data transmitted on other wireless links (sets of resources employed by other transmitter-receiver pairs). Furthermore, each transmitter-receiver pair employing a distinct wireless link forms a distinct spatial channel, also referred to as a wireless channel, or signal dimension.

Figure 11:
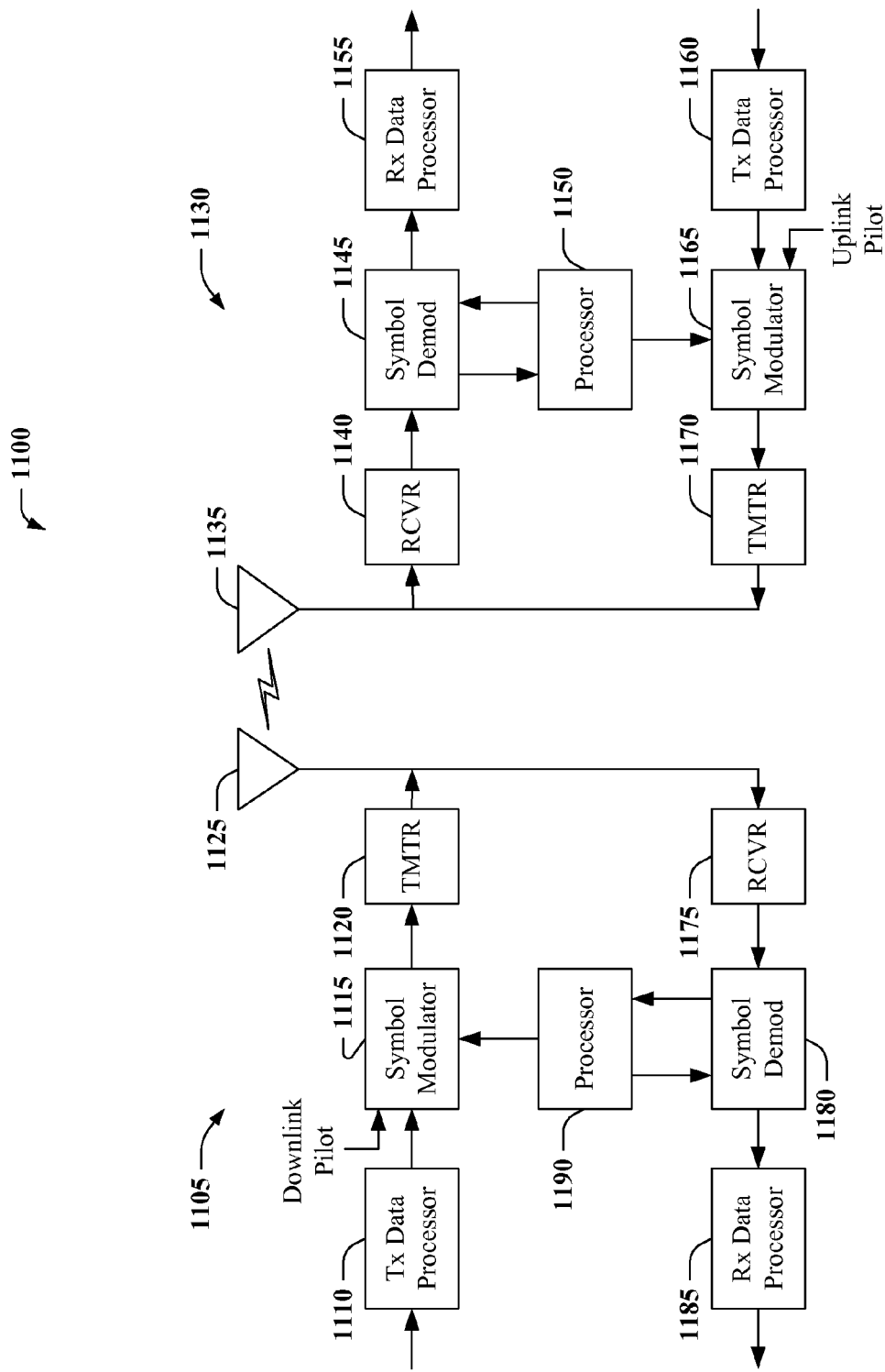
FIG. 11 depicts a block diagram of a sample wireless communications apparatus employed in implementing various aspects of the subject disclosure.

Transmission of wireless signals can be implemented by transmitter hardware in various manners (see, e.g., FIG. 11, infra). In one example wireless transmission mechanism (e.g., employed in code division multiple access [CDMA] systems, or wideband CDMA [WCDMA] systems, or other suitable systems based on third generation partnership project two [3GPP2] technology or standards), electronic information is first encoded, then mapped into a finite constellation (e.g., 16 quadrature amplitude modulation [16QAM], 64 quadrature amplitude modulation [64QAM], and so forth) of complex number modulation symbols (having both phase and amplitude), optionally precoded by a transmitter, and finally broadcast on a set of wireless resources. By tuning to the set of wireless resources, a receiver can then obtain the broadcast electronic information. However, this received information is typically distorted as a result of channel conditions (e.g., signal scattering or reflections, signal interference, environmental noise, and so on). Accordingly, after filtering and sampling the received broadcast signal, an estimate of the original modulated coded bits is generated and utilized to reconstruct the coded bits from the distorted signal. The received signal can then be de-mapped from the constellation symbols, and then decoded to reproduce the original transmitted signal.

For multi-channel communication (e.g., multiple input, multiple output [MIMO]), multiple transmitters or multiple receivers are employed to generate multiple copies of a single stream of information. These multiple copies can then be utilized to mitigate channel distortion, or enhance signal processing, thereby improving signal to noise ratios (SNRs). Accordingly, the multi-channel communication can often result in increased spectral efficiency, throughput, or reliability.

Several examples of multi-channel communication exist, depending on a number of transmit or receive antennas employed for the communication. For instance, a single stream of data sent by a single transmit antenna and obtained by two receive antennas results in two copies of the stream of data. In a similar manner, two streams of the data sent by two transmit antennas and received by a single receive antenna also results in exchange of two streams of the data. For a system comprising two transmit antennas and two receive antennas, four distinct streams of the data are exchanged, two transmit streams each obtained by two separate receive antennas. Because each interaction between a transmit antenna and receive antenna involves a unique spatial channel, each transmit-receive stream will be distinct. In addition, typically a number of transmit-receive streams=$N_{TA} \times N_{TR} = N_{WC}$, where $N_{TA}$ is a number of transmit antennas, $N_{TR}$ a number of receive antennas and $N_{WC}$ a number of wireless channels employed for the multi-channel wireless communication, respectively.

For a single transmit antenna and multiple receive antennas, wireless transmission and reception is substantially the same as described above, except that each receive antenna obtains a separate copy of the transmitted stream of data. Likewise, for two transmit antennas and two receive antennas, as many as four copies of a stream of data are obtained, resulting in even more processing overhead. For high speed data transmissions, a limited time is available to process each received bit, as additional bits are being received at a rapid rate. Accordingly, although multi-channel communication can result in increased efficiency and throughput, it can also increase processing constraints on the receiver end, increasing power consumption, increasing expense of processing hardware, and generally increasing receiver cost. Especially for mobile handsets, increased cost and power consumption is a significant problem.

The following is a particular example of receiver algorithms employed in de-mapping multi-channel wireless transmissions to illustrate complexities involved on the receiver end. It should be appreciated that the following example is illustrative only; it is not presented to limit the scope of the subject disclosure or appended claims. Rather, other suitable examples known in the art or made known to one of skill in the art by way of the context provided herein are intended to be incorporated as part of the subject disclosure.

A transmit model for a MIMO system employs a sequence of information bits $i_k$ that are split into multiple transmission copies, or transmission ranks, T. Each rank T is encoded resulting in T output spatial layers (or output streams) of coded bits $b_{T,n}$. Once encoded, sets of $K=\log_2(Q)$ such bits are used to index a modulation symbol $q_{T,m}$ from a constellation of symbols of size Q. According to one example, the modulation indexing can be performed via Gray mapping, however the subject disclosure is not so limited.

The coded and mapped bits form an input to each spatial channel (at a transmit antenna) as follows:

$$q_n = \begin{bmatrix} q_{0,n} \\ q_{1,n} \\ \ldots \\ q_{T-1,n} \end{bmatrix} = \begin{bmatrix} q(b_{0,n}) \\ q(b_{1,n}) \\ \ldots \\ q(b_{T-1,n}) \end{bmatrix} \text{ where } b_n = \begin{bmatrix} b_{0,n} \\ b_{1,n} \\ \ldots \\ b_{T-1,n} \end{bmatrix}$$

After receiver front end processing (e.g., filtering and sampling received wireless signals), a receive model for a MIMO system can be expressed as follows:

$$y = Hq + w$$

where $H \in C^{\{R \times T\}}$ is a known channel linking T transmit antennas to R receive antennas for the complex number field C, and also includes any transmitter pre-coding; w is a vector of zero mean additive complex normal noise, with identity correlation (any correlation structure is assumed without loss of generality to be captured in the channel matrix through a whitening operation); and dependency on a time symbol n is dropped. It should be noted that this receive model could be part of a single subcarrier orthogonal frequency division multiplex (OFDM) or orthogonal frequency division multiple access (OFDMA) system, or alternatively an output of a wideband filtering block for a code division multiple access (CDMA) or wideband CDMA (WCDMA) system, or other suitable system.

Based on this model, a receiver(s) employs a likelihood algorithm that generates estimates of respective bits (also referred to as bit-estimates), $b_{T,m}$, derived from different received symbols associated with the respective bits. For instance, bit $b_{T,1}$ can be estimated from bit-estimates of received symbols $q_{0,1}, q_{1,1}, q_{2,1}, \ldots q_{T+1,1}$. One example of a likelihood algorithm for generating these bit estimates employs a logarithm of maximum a posteriori estimates of these bits, $b_{T,m}$, and is also referred to as a Log-Map de-mapper. This example likelihood algorithm can have the following form:

$$L(b_t(l)) = \log\left\{\frac{\sum_{b: b_t(l)=0} \exp(-\|y - Hq(b)\|^2)}{\sum_{b': b'_t(l)=1} \exp(-\|y - Hq(b')\|^2)}\right\}$$

$$= \log\left\{\sum_{b: b_t(l)=0} \exp(-\|y - Hq(b)\|^2)\right\} -$$

$$\log\left\{\sum_{b': b'_t(l)=1} \exp(-\|y - Hq(b')\|^2)\right\}$$

Each of the respective sums are performed over all possible size KT×1 vectors b satisfying a bit-estimate of element $b_t(l)$. It should be appreciated that a complexity of this algorithm is on an order of $2^{KL}$, which can become very processing intensive at modern wireless transmission rates for even reasonable size MIMO systems. For example, two transmit antennas with 64 quadrature amplitude modulation (QAM) would require 4096 bit-estimates per received symbol under this likelihood algorithm.

The subject disclosure provides various mechanisms to reduce complexity of de-mapping processors while improving accuracy of regenerating streams of coded bits. In one aspect of the subject disclosure, summation terms of bit-estimates associated with a bit can be replaced with a subset of those bit-estimates most closely approximating the bit. As one example, the subset of bit-estimates can be those bit-estimates having the largest values (relative to other bit-estimates of the summation). In this case, approximating a bit is equated to approximating a summation term representing the bit. By replacing summation terms with a plurality of bit-estimates associated with a bit, significant processing overhead can be saved in de-mapping that bit.

According to other aspects of the subject disclosure, further reduction of processing overhead can be gained by limiting a number of bit-estimate terms analyzed to select the plurality of bit-estimates to approximate the summation terms. For instance, bit-estimates derived from one or more of the multiple wireless channels can be replaced with a constant term. The constant term can be an average of these bit-estimates' values, a median of the values, or some other statistical measure—or simply a default value (e.g., 0.5 or another suitable default value). Accordingly, by replacing sets of bit-estimates with a constant term, selecting the plurality of bit-estimates involves even less processing overhead.

According to at least one additional aspect of the subject disclosure, the likelihood algorithm can be further reduced in complexity by approximating logarithmic terms with non-logarithmic terms. Particularly, where a plurality of bit-estimates is employed to approximate a summation within a term comprising a logarithm of the summation, (e.g., $\log(\Sigma \exp(\|y - Hq(b)\|^2))$), calculating the logarithmic term can still involve considerable processing overhead. Instead, aspects of the subject disclosure reduce the logarithmic term and then approximate the logarithm. Logarithmic approximations can comprise a look-up table of logarithmic term values, a series expansion, a sum of polynomial expansion terms, and so on. According to particular aspects of the subject disclosure, a combination of one or more of the algorithm approximations can be implemented to further reduce processing overhead on the receiver end. Accordingly, the subject disclosure can significantly improve accuracy of receiver de-mapping, while achieving fast processing times for the de-mapping.

FIG. 1 illustrates a block diagram of an example system 100 according to aspects of the subject disclosure. System 100 can be employed in conjunction with any suitable wireless receiver hardware. In addition, system 100 can be implemented in conjunction with various wireless communication systems, particularly those systems that can employ multi-channel wireless communication (e.g., WCDMA, long-term evolution [LTE], high speed packet access [HSPA], and so on).

System 100 comprises a signal de-mapping apparatus 102 coupled with one or more wireless antennas 108. Wireless antenna(s) 108 can include one or more one or more receive antennas, and in some aspects can also include one or more transmit antennas. In one aspect of the subject disclosure, wireless antenna(s) 108 can be coupled with a base station of a wireless network (not depicted, but see FIG. 6, infra) or wireless relay or wireless repeater, or can be coupled with a wireless access terminal (not depicted, but see FIG. 7, infra), such as a mobile communication device, laptop computer, smartphone, cellular phone, personal digital assistant (PDA), and so on. In addition, wireless antenna(s) 108 can be employed by signal de-mapping apparatus 102 for receiving wireless information, and in some aspects for sending wireless information. According to particular aspects of the subject disclosure, signal de-mapping apparatus 102 comprises at least one wireless receiver 104 that obtains multiple wireless data streams from multiple wireless channels. For instance, wireless receiver(s) 104 can obtain received wireless signals from wireless antenna(s) 108 and filter and sample the received wireless signals, and output the multiple streams of data as filtered and sampled streams of data. The multiple wireless channels are based on multiple wireless links between wireless antenna(s) 108 and one or more transmit antennas of a transmitting device(s) (not depicted). Although depicted as part of signal de-mapping apparatus 102, it should be appreciated that wireless receiver(s) 104 can be separate wireless receiver hardware (e.g., part of a base station or wireless device) or included in a separate hardware or software module relative signal de-mapping apparatus 102.

Further to the above, signal de-mapping apparatus 102 can comprise at least one data processor 106 for executing a set of modules configured to implement multi-channel wireless communication. The multi-channel wireless communication can include multiple-input single output (MISO) communication, single input multiple output (SIMO) communication, or MIMO communication, utilizing the multiple wireless channels associated with wireless antenna(s) 108. In one aspect, data processor(s) 106 can execute an operation module 110 that employs a probabilistic algorithm (also referred to herein as a likelihood algorithm) to transform a set of symbols sampled from the multiple wireless data streams into a bit of data. It should be appreciated that the set of symbols can be generated by a transmitting device mapping the bit into a constellation of modulation symbols, for one or more transmit data streams, wherein the one or more transmit data streams comprise a subset of the multiple wireless data streams. As illustrative examples, the set of symbols can be employed to modulate the bit for a single transmit data stream that is received by a plurality of wireless receivers 104 (e.g., SIMO communication), or employed to modulate the bit for multiple transmit data streams, received by a single wireless receiver 104 (e.g., MISO communication), or employed to modulate the bit for multiple transmit data streams, two or more of which are received by two or more of the plurality of wireless receivers 104 (e.g., MIMO communication). Once the set of symbols is transformed into the bit of data, operation module 110 can output de-mapped bits 116, which can be decoded to reproduce an original stream of information sent by a transmitting device.

To increase accuracy or efficiency of transforming the set of symbols into the bit of data, data processor(s) 106 can execute a reduction module 112 that simplifies the probabilistic algorithm employed by operation module 110 with an approximation 114. According to one particular aspect of the subject disclosure, approximation 114 can comprise approximating a sum of the set of symbols with a subset of the set of symbols that are closely correlated with the bit, wherein the subset comprises at least two, but less than all, of the set of symbols. Thus, in order to reduce processing overhead in transforming the set of symbols into the bit of data, approximation 114 enables selection of a subset of the set of symbols to replace the sum of the set of symbols. As one particular illustrative example, the subset of the set of symbols can comprise two symbols that best approximate the sum (and thus are closely correlated with the bit), although it should be appreciated that the subset of the set of symbols can comprise other numbers of symbols as well (e.g., three symbols, four symbols, and so on). For this latter example employing two symbols, approximation 114 can have the following mathematical form:

$$L(b_t(l)) = \log\left\{\sum_{b:b_t(l)=0} \exp(-\|y - Hq(b)\|^2)\right\} -$$

$$\log\left\{\sum_{b':b'_t(l)=1} \exp(-\|y - Hq(b')\|^2)\right\}$$

$$\approx \log\{\exp(-\|y - Hq(b_{0,0})\|^2) + \exp(-\|y - Hq(b_{0,1})\|^2)\} -$$

$$\log\{\exp(-\|y - Hq(b_{1,0})\|^2) + \exp(-\|y - Hq(b_{1,1})\|^2)\}$$

where $b_{0,0}$=a minimum argument of $\|y-Hq(b)\|^2$ for $b_t(l)=0$, $b_{0,1}$=a minimum argument of $\|y-Hq(b)\|^2$ for $b_t(l)=0, b\neq b_{0,0}$, $b_{1,0}$=a minimum argument of $\|y-Hq(b)\|^2$ for $b_t(l)=1$; and $b_{1,1}$=a minimum argument of $\|y-Hq(b)\|^2$ for $b_t(l)=1, b\neq b_{1,0}$. Said differently, $b_{0,0}$ is a symbol that minimizes the term $\|y-Hq(b)\|^2$ for $b_t(l)=0$ (or the symbol that maximizes the term $\|y-Hq(b)\|^2$) for $b_t(l)=0$), $b_{0,1}$ is a symbol, after excluding the term $b_{0,0}$, that minimizes the term $\|y-Hq(b)\|^2$ for $b_t(l)=0$, $b_{1,0}$ is a symbol that minimizes the term $\|y-Hq(b)\|^2$ for $b_t(l)=1$, and $b_{1,1}$ is a symbol, after excluding the term $b_{1,0}$, that minimizes the term $\|y-Hq(b)\|^2$ for $b_t(l)=1$. Thus, the foregoing equation employs the two largest symbol terms within each sum to approximate and replace the respective sum. This reduces complexity of the probability algorithm, while increasing accuracy over single-symbol approximations. The above equation can be written in a simpler form as follows with the substitution of terms defined below:

$$= \log\{\exp(-d^2_{0,0})+\exp(-d^2_{0,1})\}-\log\{\exp(-d^2_{1,0})+\exp(-d^2_{1,1})\} \text{ where } -d^2_{0,0}=\|y-Hq(b_{0,0})\|^2;$$

$$-d^2_{0,1}=\|y-Hq(b_{0,1})\|^2;$$

$$-d^2_{1,0}=\|y-Hq(b_{1,0})\|^2; \text{ and}$$

$$-d^2_{1,1}=\|y-Hq(b_{1,1})\|^2, \text{ respectively.}$$

According to alternative or additional aspects of the subject disclosure, reduction module 112 further simplifies the probabilistic algorithm. For instance, reduction module 112 can provide an approximation 114 for selecting the subset of the set of symbols from fewer than all symbols of the set of symbols. In such a manner, processing involved in selecting the subset of the set of symbols is reduced. As a specific example, reduction module 112 establishes approximation 114 to have a constant correlation value (wherein the correlation value of a symbol q(b) is derived from the term $(-\|y-Hq(b)\|^2)$ for instance) for symbols derived from one or more of the multiple wireless data streams. Thus, the constant correlation value is substituted for correlation values of the symbols derived from at least one of the multiple wireless data streams. This reduces a number of symbols analyzed in determining an approximation for the sum terms, reducing complexity of the probability algorithm.

As a particular illustrative example of the foregoing, operation module 110 can analyze respective streams of the multiple wireless data streams separately. In addition, when analyzing a particular stream, only symbols of the particular stream are independently considered in selecting the subset of the set of symbols. For streams other than the particular stream, a constant correlation value (or respective constant correlation values) is substituted for symbols associated with the bit being transformed by operation module 110. Thus, for instance, in a case of four wireless streams of data each comprising four symbols associated with the bit of data (sixteen symbols total), approximation 114 can specify independent analysis of each symbol of one of the streams, while replacing respective symbols of each of the other three streams with a constant correlation value. Thus, operation module 110 need only analyze seven symbols when selecting the subset of symbols that approximate a sum (four symbols/correlation values of the one stream, and one symbol/correlation value each from the respective other three streams). Said differently, reduction module 112 can further simplify the probabilistic algorithm by establishing constant correlation values for symbols derived from all of the multiple wireless data streams except for a selected one of the multiple wireless data streams, and further wherein the reduction module 112 selects the subset from among the constant correlation values and from among non-constant correlation values of symbols from the selected one of the multiple wireless data streams.

As utilized herein, the constant correlation value can be one of various suitable correlation values. In one aspect, the constant correlation value can be the largest correlation value associated with a bit for a particular stream of data. In another aspect, the constant correlation value can be a median correlation value, average correlation value, and so forth, for the stream of data. In at least one aspect, the constant correlation value can be a default value (e.g., 0.5 or other suitable value). In mathematical terms, for a particular stream t, a wireless channel R×(T−1) and bit sequences K(T−1)×1 associated with the other T−1 data streams can be denoted by $H_{\bar{i}}$ and $q(b_{\bar{i}})$, respectively. In such case, the received wireless data streams can be expressed as:

$$y = h_t q(b_t) + H_{\bar{i}} g(b_{\bar{i}}) + w$$

and furthermore:

$$L(b_t(l)) = \log\left\{\sum_{b: b_t(l)=0} \exp(-\|y - Hq(b)\|^2)\right\} -$$

$$\log\left\{\sum_{b': b'_t(l)=1} \exp(-\|y - Hq(b')\|^2)\right\}$$

$$\approx \log\left\{\max_{b_{\bar{i}}} \sum_{b_t: b_t(l)=0} \exp(-\|y - h_t q(b_t) - H_{\bar{i}} q(b_{\bar{i}})\|^2)\right\} -$$

$$\log\left\{\max_{b_{\bar{i}}} \sum_{b'_t: b'_t(l)=1} \exp(-\|y - h_t q(b'_t) - H_{\bar{i}} q(b'_{\bar{i}})\|^2)\right\}$$

According to still other aspects of the subject disclosure, reduction module 112 further simplifies the probabilistic algorithm by approximating a logarithmic term with a non-logarithmic function. In one illustrative example, the logarithmic term is a logarithm of a sum of multiple terms that are respectively derived from different symbols of the subset of the set of symbols, described above. Further, in at least one aspect of the subject disclosure, the non-logarithmic function comprises a look-up table of data values associated with the logarithmic term. In other aspects of the subject disclosure, the non-logarithmic function comprises a series expansion (e.g., a Taylor series expansion) of the logarithmic term. In yet other aspects, the non-logarithmic function comprises a polynomial equation or set of polynomial equations that approximate the logarithmic term. It should be appreciated that the subject disclosure is not limited to the foregoing aspects and examples, however. Mathematically, approximating the logarithmic term with the non-logarithmic function can be expressed as follows:

$$L(b_t(l)) = \log\{\exp(-d_{0,0}^2) + \exp(-d_{0,1}^2)\} -$$

$$\log\{\exp(-d_{1,0}^2) + \exp(-d_{1,1}^2)\}$$

$$\approx L*\{\exp(-d_{0,0}^2), \exp(-d_{0,1}^2)\} -$$

$$L*\{\exp(-d_{1,0}^2), \exp(-d_{1,1}^2)\}$$

based on the following definition:

$L*(e^{-a}, e^{-b}) = -a + \log(1 + \exp(b-a)) = C_\delta(b-a) - \min(a,b)$ for $b \geq a \geq 0$, where $C_\delta(b-a)$ is the non-logarithmic function, or correction factor, discussed above. Further, it should be appreciated that this non-logarithmic correction factor can be indexed by b−a.

Although approximation 114 generated by reduction module 112 is presented above as one of multiple approximations for reducing complexity or improving accuracy of the probability function, the subject disclosure is not so limited. For instance, a combination of employing a subset of the set of symbols, selecting the subset from fewer than all symbols of the set of symbols, or approximating a logarithmic term with a non-logarithmic function can be employed as part of approximation 114. In at least one aspect of the subject disclosure, a combination of the foregoing can be employed by approximation 114.

Figure 2A:
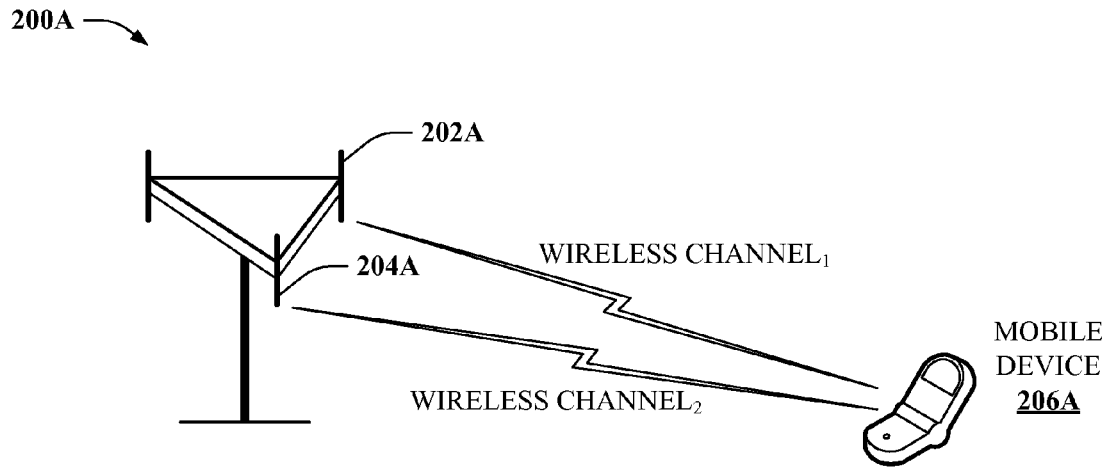
FIGS. 2A, 2B and 2C depict respective diagrams of various example multi-channel wireless communication environments according to disclosed aspects.
Figure 2B:
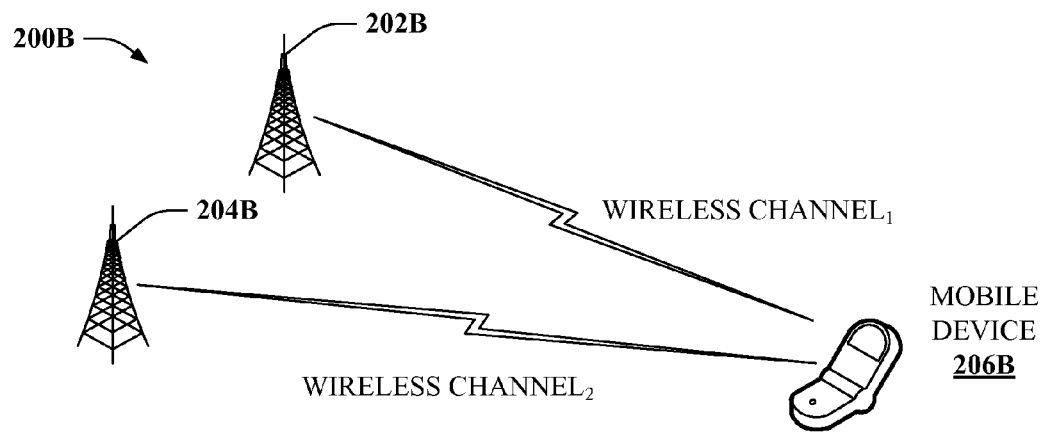
Figure 2C:
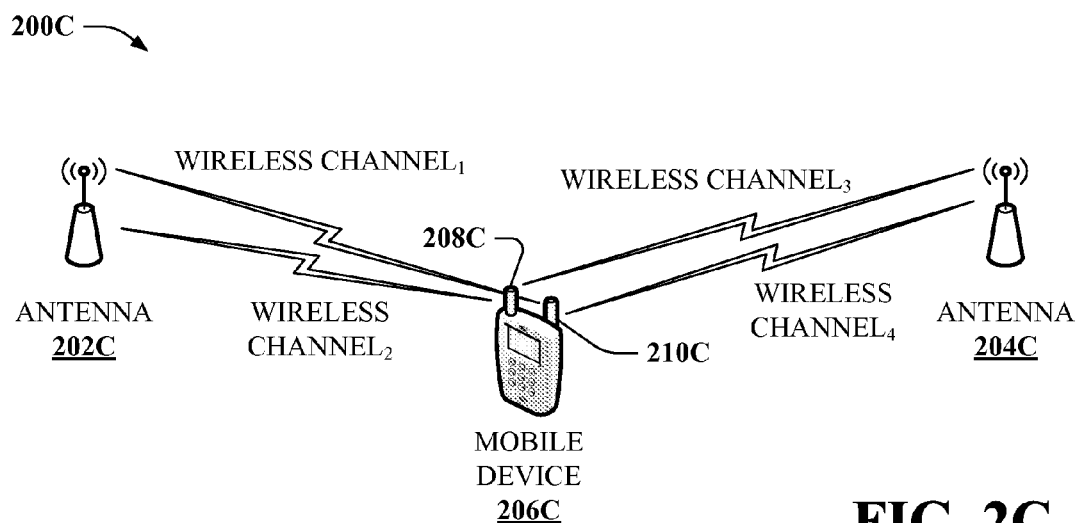

FIGS. 2A, 2B and 2C depict diagrams of example multi-channel wireless communication arrangements 200A, 200B, 200C according to aspects of the subject disclosure. It should be appreciated, however, that multi-channel wireless communication arrangements 200A, 200B, 200C are illustrative examples, and are not intended to encompass all possible multi-channel wireless communication arrangements that can be employed aspects of the subject disclosure. For instance, although multi-channel wireless communication arrangements 200A, 200B, 200C are respectively depicted with a single mobile device (206A, 206B, 206C), a suitable multi-channel wireless communication arrangement can also include multiple mobile devices coupled via a peer-to-peer link, or coupled via a wireless repeater or wireless relay, or some other suitable mobile to mobile communication link.

Multi-channel wireless communication arrangement 200A depicts a wireless base station comprising multiple wireless antennas 202A and 204A. The respective wireless antennas 202A, 204A can be transmit antennas or receive antennas, or both. In addition, the respective wireless antennas 202A, 204A form respective wireless channels, wireless channel$_1$ and wireless channel$_2$, with a mobile device 206A, which comprises a single receive antenna. Furthermore, the respective wireless antennas 202A, 204A are configured for MISO communication with mobile device 206A, such that a single stream of electronic information is transmitted over both of the wireless channels concurrently. Utilizing a single receive antenna, mobile device 206A can observe the respective wireless channels as interfering channels, and utilize processing techniques to de-map and demodulate the single stream of electronic information from the wireless channels, as described herein. Specifically, mobile device 206A can obtain multiple wireless data streams from the multiple wireless channels, and employ a probability algorithm to derive the stream of electronic information from channel effects and noise associated with the respective wireless channels. Furthermore, the probability algorithm can be simplified by one or more of the approximations described herein.

Multi-channel wireless communication arrangement 200B depicts two separate base stations 202B, 204B establishing respective wireless channels, wireless channel$_1$ and wireless channel$_2$, with a mobile device 206B. Although not depicted, MISO communication can be coordinated between the respective base stations 202B, 204B via a backhaul link coupling the base stations 202B, 204B, or via a central controller (e.g., a base station controller) communicatively coupled with the respective base stations 202B, 204B. In either case, base stations 202B, 204B separately transmit a common stream of electronic information to mobile device 206B, which employs a single receiver to obtain the common stream of electronic information as multiple wireless data streams. In both multi-channel wireless communication arrangements 200A and 200B, two wireless channels are formed as a result of two transmit antennas (wireless antennas 202A, 204A and base stations 202B, 204B respectively) communicatively coupled with a single receive antenna of a mobile device 206A, 206B. It should be appreciated, however, that a similar two-channel arrangement can be formed with a single transmit antenna and dual receive antennas for the respective cases instead (modeling SIMO communication).

Multi-channel wireless communication arrangement 200C depicts a MIMO communication, comprising two transmit antennas 202C, 204C and a mobile device 206C comprising two receive antennas 208C, 210C. As depicted, each transmit antenna 202C, 204C forms a separate wireless channel with each of the respective receive antennas 208C, 210C. Specifically, transmit antenna 202C forms wireless channel$_1$ with receive antenna 210C, and wireless channel$_2$ with receive antenna 208C. Likewise, transmit antenna 204C forms wireless channel$_3$ with receive antenna 208C and wireless channel$_4$ with receive antenna 210C. Accordingly, multi-channel wireless communication arrangement 200C models a 2×2 MIMO communication arrangement. By employing a communication link (not depicted) between transmit antennas 202C and 204C, such as a backhaul or central controller, a single stream of information can be transmitted concurrently by the respective transmit antennas 202C, 204C. Further, mobile device 206C can obtain each transmitted stream at each of its' receive antennas 208C, 210C, resulting in four received wireless streams of data. The four received wireless streams of data can be de-mapped to reproduce the single stream of information. Additionally, by employing one or more of the de-mapping approximations described herein, mobile device 206C can mitigate a significant amount of processing overhead and power consumption in reproducing the stream of information. Further, by employing a subset of received symbols in those de-mapping approximations, relatively high accuracy can be achieved for the de-mapping over conventional techniques, resulting in improved wireless reception for the MIMO communication arrangement. It should be appreciated that other MIMO communication arrangements are contemplated as part of the subject disclosure. For instance, additional transmit or receive antennas (employed by mobile device 206C or other devices in peer-to-peer communication therewith) can be employed to create a 3×2 MIMO communication arrangement, 4×4 MIMO communication arrangement, and so on.

Figure 3:
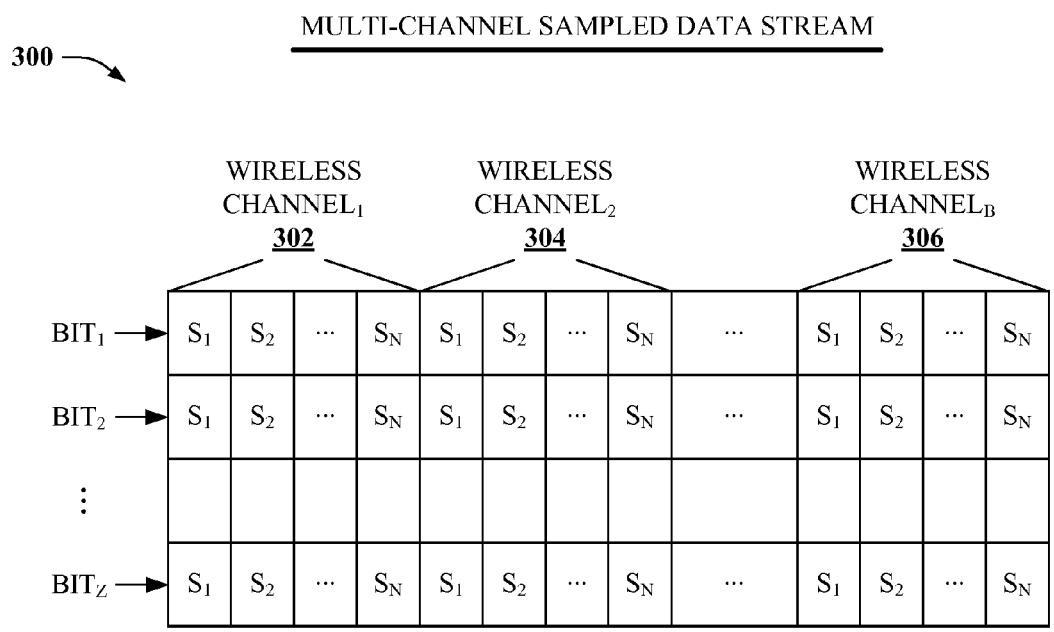
FIG. 3 illustrates a representative diagram of an example multi-channel sampled data stream obtained at a wireless receiver according to further aspects.

FIG. 3 illustrates an example multi-channel sampled data stream 300 suitable for multi-channel communication according to aspects of the subject disclosure. Multi-channel sampled data stream 300 can be a set of data, filtered and sampled by one or more wireless receivers, forming multiple wireless channels. Specifically, the multi-channel sampled data stream 300 comprises a plurality of bits (rows), including Bit$_1$, Bit$_2$, ..., Bit$_Z$, where Z is a positive integer. Each bit is mapped to a finite constellation (columns) of N modulation symbols (e.g., S$_1$, S$_2$, ..., S$_N$, where N is another positive integer), for each of multiple wireless channels (e.g., wireless channel$_1$ 302, wireless channel$_2$ 304, ... wireless channel$_B$ 306 where B is an integer greater than one). It should be appreciated, however, that the received symbols from the respective wireless channels 302, 304, 306 are not exact replicas of transmitted bits. Rather, the received symbols are affected by channel conditions as well as noise, rendering each received symbol distinct. Accordingly, the wireless receiver(s) employs a probability or likelihood algorithm to generate bit-estimates of each bit from received symbols associated with the respective bits. To reduce complexity of this algorithm(s), the wireless receiver(s) can employ various approximations, reducing processing overhead involved in calculating one or more bit-estimates. For instance, a subset of the bit-estimates can be employed, optionally derived from a limited set of the wireless channels 302, 304, 306. Furthermore, terms requiring high processing overhead, such as a logarithm of a sum of bit-estimates, can be approximated by non-logarithmic functions, as described herein. Accordingly, multi-channel sampled data stream 300 can be processed more quickly, alleviating processing overhead and power consumption for the wireless receiver(s). This benefit can be particularly useful when implemented in conjunction with a mobile communication device, where avoiding expensive processing hardware is desired, as well as minimizing power consumption to preserve battery life.

Figure 4:
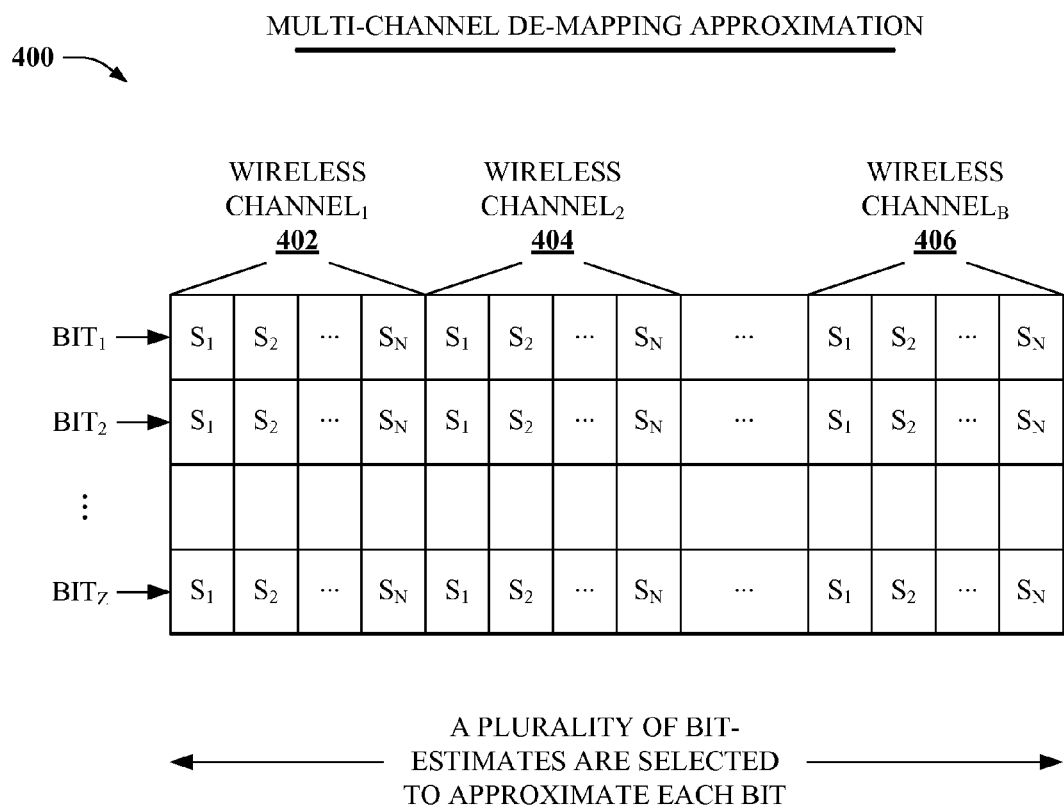
FIG. 4 depicts a representative diagram of a sample multi-channel de-mapping approximation according to still other aspects.

FIG. 4 illustrates a sample multi-channel de-mapping approximation of a multi-channel sampled data stream 400 according to further aspects of the subject disclosure. It should be appreciated that multi-channel sample data stream 400 can be substantially similar to multi-channel sample data stream 300 of FIG. 3, supra. Particularly, the multi-channel sample data stream 400 can comprise a set of bits (Bit$_1$, Bit$_2$, ..., Bit$_Z$) mapped into a finite constellation of modulation symbols (S$_1$, S$_2$, ..., S$_N$) for each of a set of wireless channels, including wireless channel$_1$ 402, wireless channel$_2$ 404, ..., wireless channel$_B$ 406. Furthermore, in order to reproduce the respective bits from the symbols of multi-channel sampled data stream 400, a plurality of symbols associated with each bit (e.g., within the same row as each bit) are employed to approximate the respective bits. The plurality of symbols comprises less than all of the symbols associated with each respective bit, however. In this manner, complexities involved in calculating the respective bits can be reduced, while maintaining substantially high accuracy in determining the bits. In one particular example, the plurality of symbols employed in generating bit-estimates for the respective bits can comprises two symbols per bit. Further, the two symbols can be selected based on how closely correlated they are with the particular bit. In this example, correlation can be established by identifying the two symbols whose bit-estimates best approximate a sum of all bit-estimates associated with the particular bit. Thus, for instance, two symbols associated with each bit having the largest bit-estimates of the respective bits can be selected.

In at least one particular example of the subject disclosure, reproducing a bit can be further simplified over and above selecting the plurality of symbols employed in generating bit-estimates of the bit. Particularly, a probability algorithm employed in deriving the bit from the bit-estimates can be simplified. For instance, if the probability algorithm employs a logarithm of a sum of the bit-estimates, employing the plurality of symbols/bit-estimates will still result in a logarithm of a sum term (having fewer arguments). Accordingly, in such case the logarithm of the sum can be approximated with a non-logarithmic function. This non-logarithmic function can be selected so as to reduce processing overhead involved in calculating the bits. As particular examples, the non-logarithmic function can comprise a look-up table, a Taylor series expansion, a sum of suitable polynomial terms, or another suitable function. As a result of this approximation, a plurality of symbols can be utilized to estimate respective bits, without substantially increasing processing overhead as compared with single-symbol estimates of the bits. Thus, accuracy of de-mapping the bits can be improved without substantially increasing time required for the de-mapping. This can result in better transmit-receive correlation, without negatively affecting power consumption or processing times at a wireless receiver.

Figure 5:
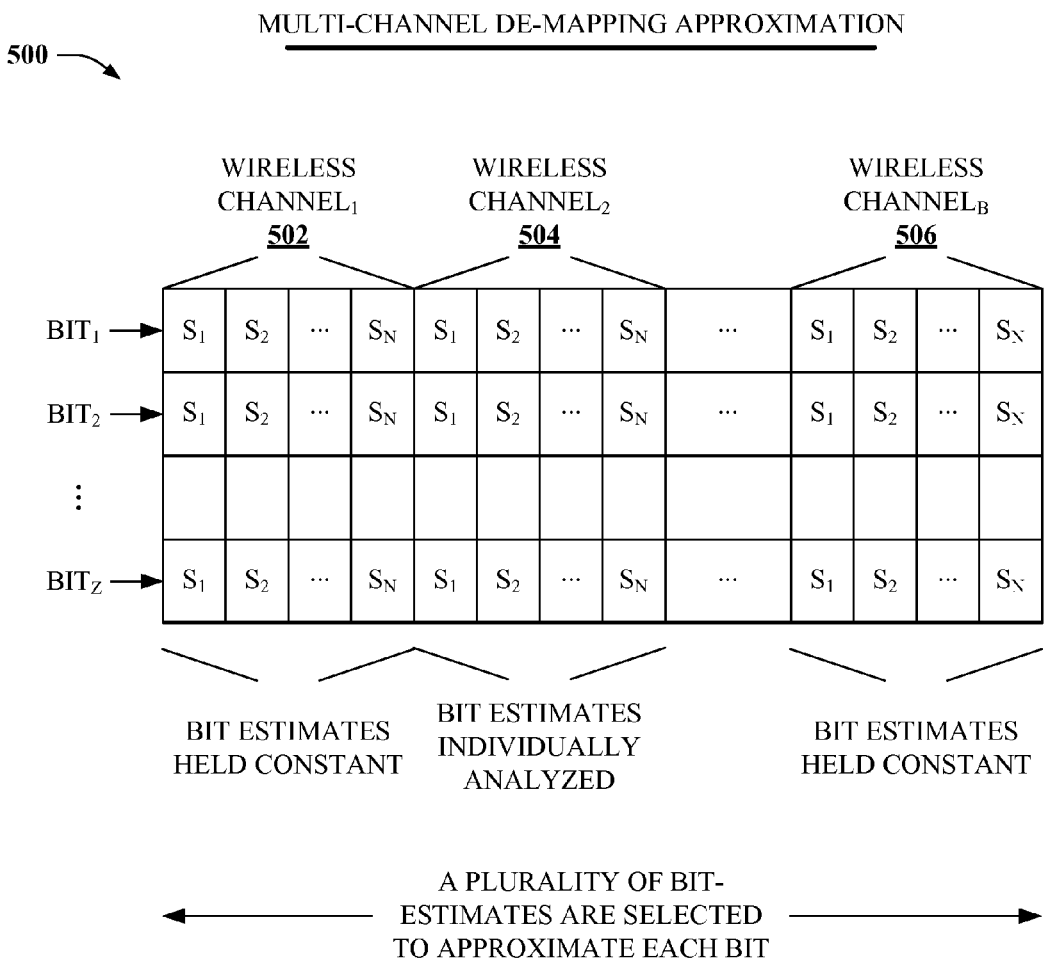
FIG. 5 illustrates a representative diagram of an additional example multi-channel de-mapping approximation according to further aspects.

FIG. 5 illustrates a sample multi-channel de-mapping approximation of a multi-channel sampled data stream 500 according to further aspects of the subject disclosure. Further, it should be appreciated that multi-channel sampled data stream 500 can be substantially similar to multi-channel sampled data streams 300 or 400. In addition, the multi-channel de-mapping approximation of FIG. 5 can provide additional simplification for a probability algorithm employed to de-map a set of transmitted bits (Bit$_1$, Bit$_2$, ..., Bit$_Z$).

As with the multi-channel de-mapping approximation of FIG. 4, supra, respective bits of multi-channel sampled data stream 500 can be estimated from a plurality of symbols associated with the respective bits. However, analysis required to select the plurality of symbols can be further simplified. Specifically, this simplification can be achieved by limiting a number of symbols from which the plurality of symbols is selected. This can directly reduce processing overhead involved in selecting the plurality of symbols, and reduce time or complexity involved in deriving the bits. To limit the number of symbols employed in selecting the plurality of symbols, each bit is analyzed separately with respect to a set of symbols obtained from a particular wireless channel 502, 504, 506. When analyzing a bit, e.g., $Bit_1$, with respect to wireless $channel_2$ 504, for instance, bit-estimates (also referred to herein as correlation values) of $Bit_1$ can be limited to a subset of the set of symbols associated with $Bit_1$. Particularly, bit-estimates of wireless $channel_2$ 504 are analyzed individually, whereas bit-estimates of the B−1 other wireless channels (502, 506) are replaced with a constant bit-estimate (or constant correlation value) instead. This constant bit-estimate can be the largest or most correlated bit-estimate for a particular wireless channel, an average bit-estimate for the particular wireless channel, a median bit-estimate for the particular wireless channel, or the like. In at least one example, the constant bit-estimate can be a default bit-estimate (e.g., having 0.5 correlation value). It should be appreciated that, possibly excepting the latter case, a different constant bit-estimate can be employed for the different B−1 other wireless channels (502, 506). This can substantially decrease a number of bit-estimates that must be derived in order to identify those bit-estimates most closely correlated with each respective bit. Accordingly, the multi-channel de-mapping approximation of FIG. 5 can substantially reduce processing time associated with de-mapping a set of received bits.

Figure 6:
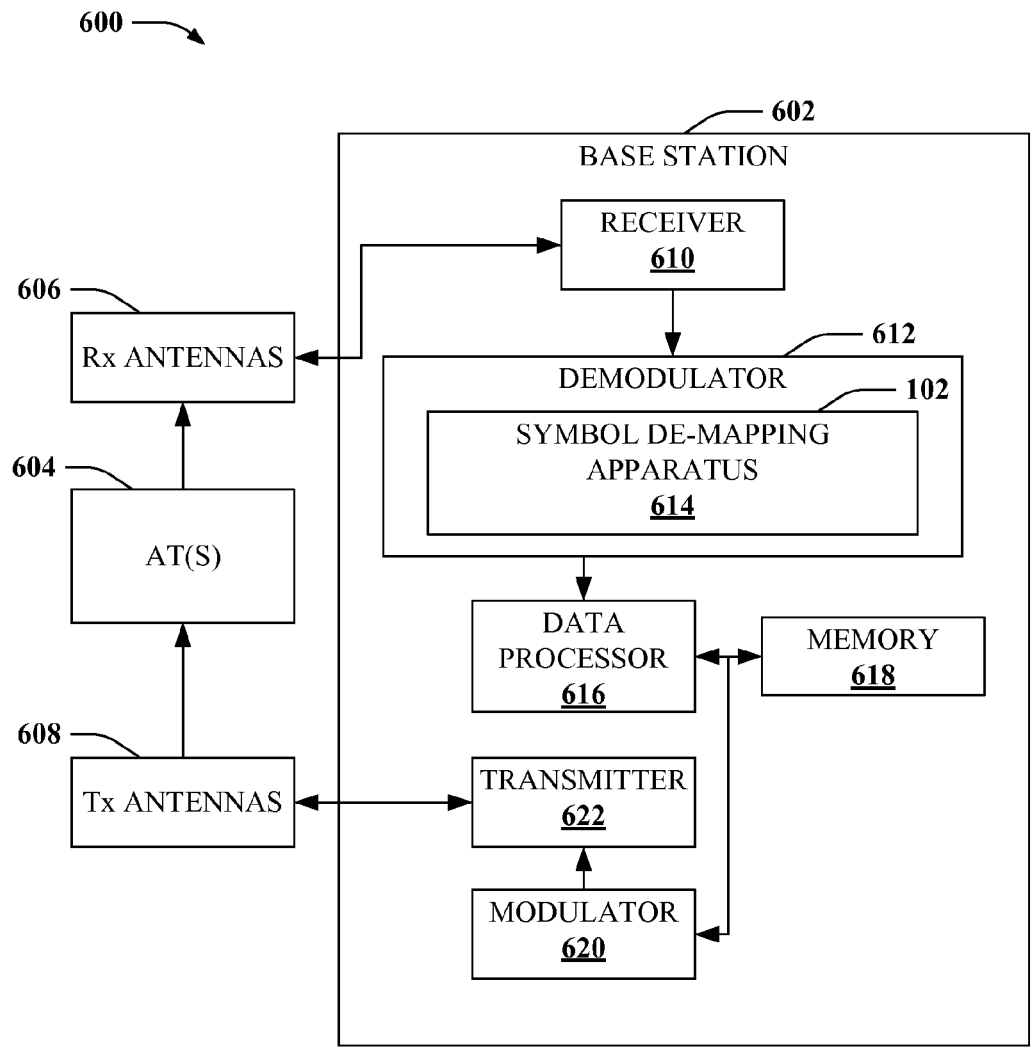
FIG. 6 depicts a block diagram of an example wireless network base station that provides improved multi-channel signal de-mapping according to an aspect.

FIG. 6 depicts a block diagram of a sample system 600 comprising a wireless base station 602 configured for aspects of the subject disclosure. Specifically, system 600 can comprise a base station 602 that provides improved de-mapping of received wireless signals. For instance, base station 602 can employ one or more mechanisms for simplifying the de-mapping of received wireless signals, while maintaining high transmit-receive correlation. Accordingly, base station 602 provides improved reliability in communications, by reducing processing time or power consumption, or both, while maintaining high accuracy.

Base station 602 (e.g., access point, . . . ) can comprise a receiver 610 that obtains wireless signals from one or more of ATs 604 through one or more receive antennas 606, and a transmitter 622 that sends coded/modulated wireless signals provided by modulator 620 to the AT(s) 604 through a transmit antenna(s) 608. Furthermore, it should be appreciated that transmit antenna(s) 608 and receive antenna(s) 606 can form a plurality of wireless channels with AT(s) 604, to achieve multi-channel wireless communication (e.g., SIMO communication, MISO communication, MIMO communication . . . ).

Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. In particular, demodulator 612 can comprise a symbol de-mapping apparatus 614 for de-mapping the uplink data transmitted by AT(s) 604. It should be appreciated that, in at least one aspect of the subject disclosure, symbol de-mapping apparatus 614 can be substantially similar to signal de-mapping apparatus 102 of FIG. 1, supra. Demodulated symbols are analyzed by a data processor 616. Data processor 616 is coupled to a memory 618 that stores information related to functions provided or implemented by base station 602.

As described herein, symbol de-mapping apparatus 614 can employ a probabilistic algorithm to reproduce the uplink data transmitted by AT(s) 604. In addition, various simplification mechanisms can be employed to reduce processing overhead in calculating the probabilistic algorithm. In one instance, a subset of a set of wireless symbols can be employed to generate bit-estimates of received data bits. This can reduce processing time required in generating bit-estimates from each of the received wireless symbols. Furthermore, the subset of wireless symbols can be selected from the wireless symbols that are most closely correlated with the respective received data bits, to maintain high accuracy in de-mapping the data bits. Moreover, in at least one aspect, the subset of wireless symbols can be selected from a limited set of the wireless symbols. Particularly, a single bit-estimate can be utilized for wireless symbols obtained from one or more of the wireless channels employed by base station 602, as described herein. This can reduce a number of bit-estimates that are analyzed to obtain the subset of wireless symbols. Alternatively, or in addition to the foregoing, symbol de-mapping apparatus 614 can employ a non-logarithmic function to approximate a logarithmic term of the probabilistic algorithm. Particularly, where the subset of wireless symbols results in a logarithm of a sum term, the non-logarithmic function can be substituted for the logarithm of the sum term, to avoid calculating the logarithm of the sum directly. This can further reduce processing overhead involved in de-mapping the data bits, enabling high-speed communication between base station 602 and AT(s) 604, while maintaining relatively high de-mapping accuracy.

Figure 7:
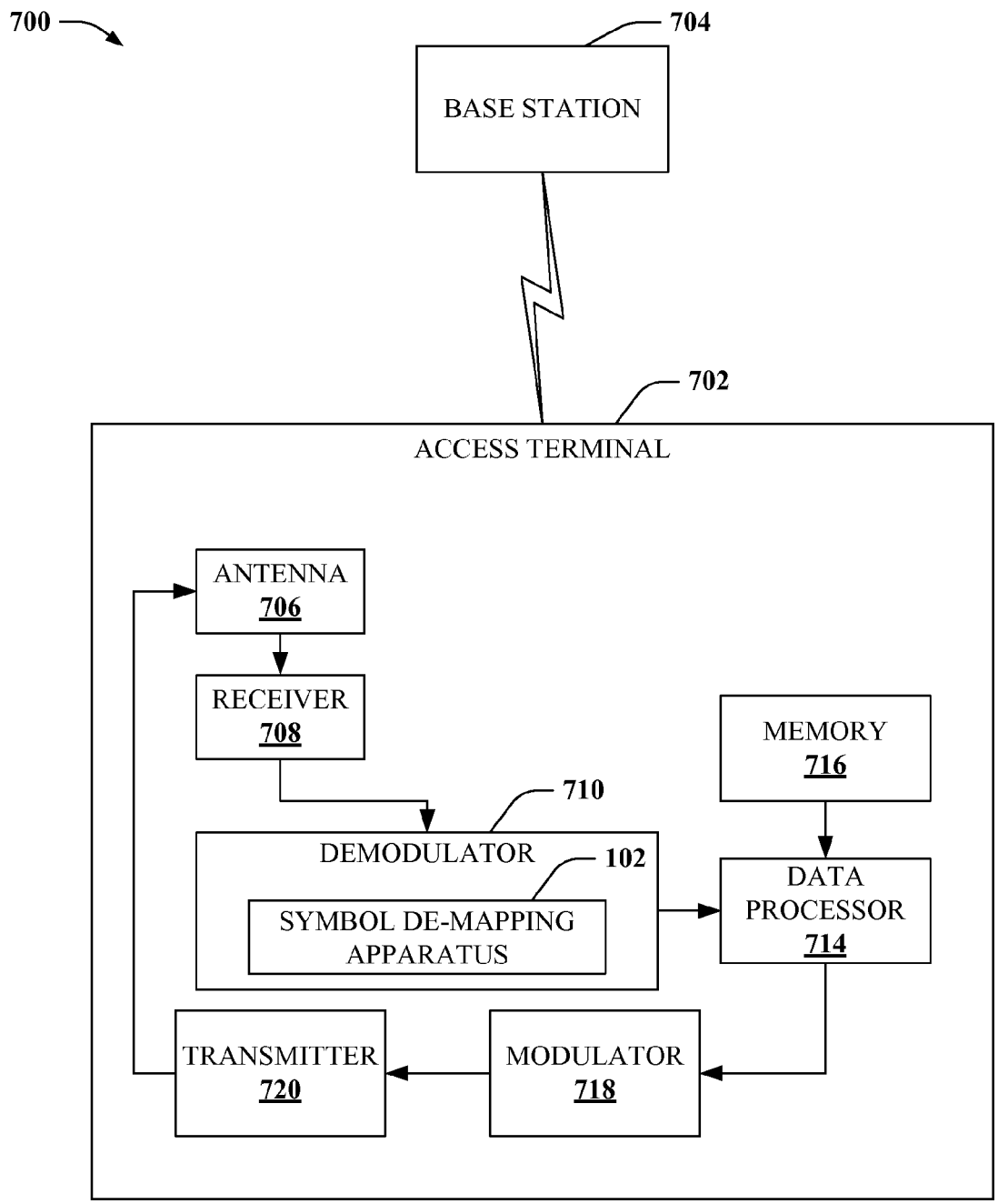
FIG. 7 illustrates a block diagram of a sample mobile device configured for improved multi-channel signal de-mapping according to another aspect.

FIG. 7 depicts a block diagram of an example system 700 comprising an AT 702 configured for wireless communication according to aspects of the subject disclosure. AT 702 can be configured to wirelessly communicate with one or more base stations 704 (e.g., access point) of a wireless network. Based on such configuration, AT 702 can receive wireless signals from a base station 704 on a forward link channel and respond with wireless signals on a reverse link channel. In addition, AT 702 can comprise instructions stored in memory 714 for analyzing received wireless signals, and for reducing processing overhead involved in de-mapping the received wireless signals, as described herein.

AT 702 includes at least one antenna 706 (e.g., comprising one or more input/output interfaces) that receives a signal and receiver(s) 708, which perform typical actions (e.g., filters, amplifies, down-converts, etc.) on the received signal. In general, antenna 706 and a transmitter 720 (collectively referred to as a transceiver) can be configured to facilitate wireless data exchange with base station(s) 704.

Antenna 706 and receiver(s) 708 can also be coupled with a demodulator 710 that can demodulate received symbols and provide such signals to a data processor(s) 714 for evaluation. Particularly, demodulator 710 can comprise a symbol de-mapping apparatus 712 operably coupled with AT 702 (e.g., a mobile communication device), for de-mapping received data bits from a constellation of modulation symbols generated by base station(s) 704. In at least one aspect of the subject disclosure, symbol de-mapping apparatus 712 can be substantially similar to other such apparatuses described herein (e.g., signal de-mapping apparatus 102, symbol de-mapping apparatus 614). Specifically, symbol de-mapping apparatus 712 can employ one or more algorithmic approximations to reduce complexity involved in de-mapping the received data bits. The algorithmic approximations can comprise one or more of employing a subset of a set of symbols associated with a bit for de-mapping the bit, limiting the set of symbols from which the subset of symbols is derived, or approximating logarithmic terms of probability algorithm with non-logarithmic functions, as described herein.

It should be appreciated that data processor(s) 714 can control and/or reference one or more components (antenna 706, receiver 708, demodulator 710, memory 716, modulator 718, transmitter 720) of AT 702. Further, data processor(s) 714 can execute one or more modules, applications, engines, or the like that comprise information or controls pertinent to executing functions of the AT 702.

Additionally, memory 716 of AT 702 is operatively coupled to data processor(s) 714. Memory 716 can store data to be transmitted, received, and the like, and instructions suitable to conduct wireless communication with a remote device (e.g., base station 704). Specifically, the instructions can be utilized to implement the various functions described above, or elsewhere herein. Further, although not depicted, memory 716 can store the modules, applications, engines, etc. (e.g., operation module 110, reduction module 112) executed by data processor(s) 712, above.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 702, base station 602, and signal de-mapping apparatus 102, or a different combination of these or other modules. Sub-modules could also be implemented as modules communicatively coupled to other modules rather than included within parent modules. Additionally, it should be noted that one or more modules could be combined into a single module providing aggregate functionality. For instance, operation module 110 can include reduction module 112, or vice versa, to facilitate employing a probabilistic algorithm to transform a set of symbols into a bit, and simplifying the probabilistic algorithm by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
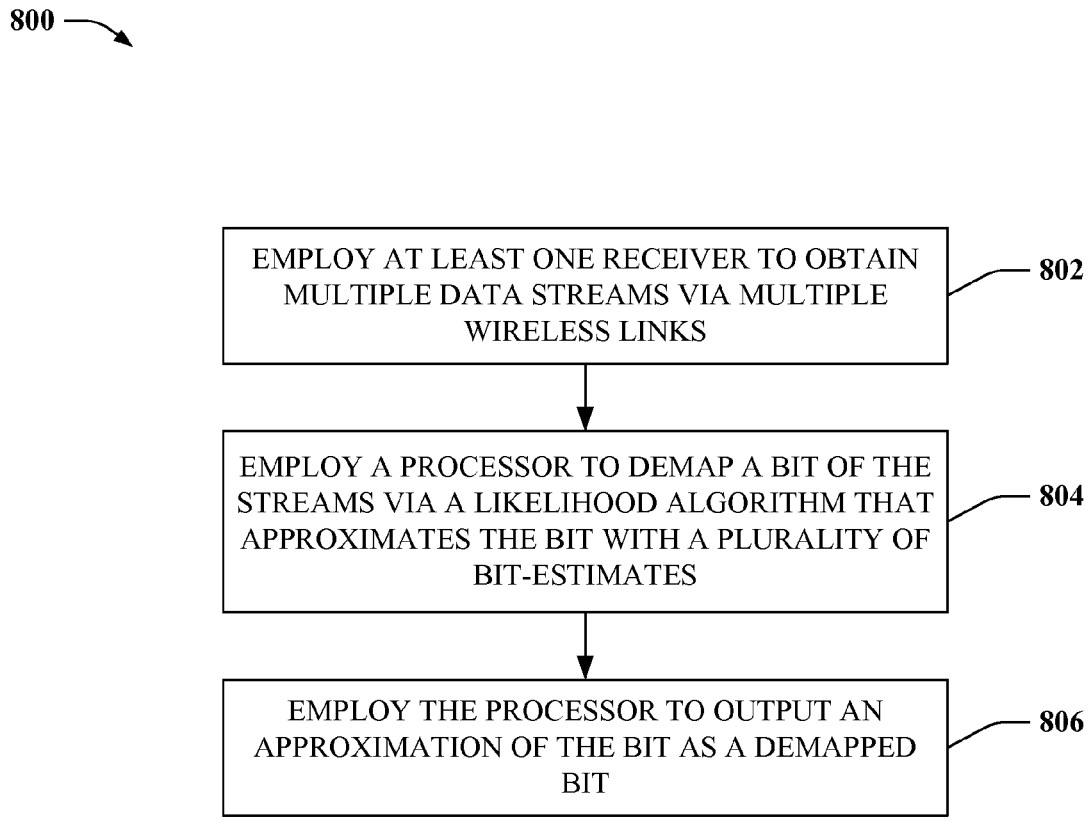
FIG. 8 depicts a flowchart of an example methodology for multi-channel signal de-mapping according to one or more other aspects of the subject disclosure.
Figure 9:
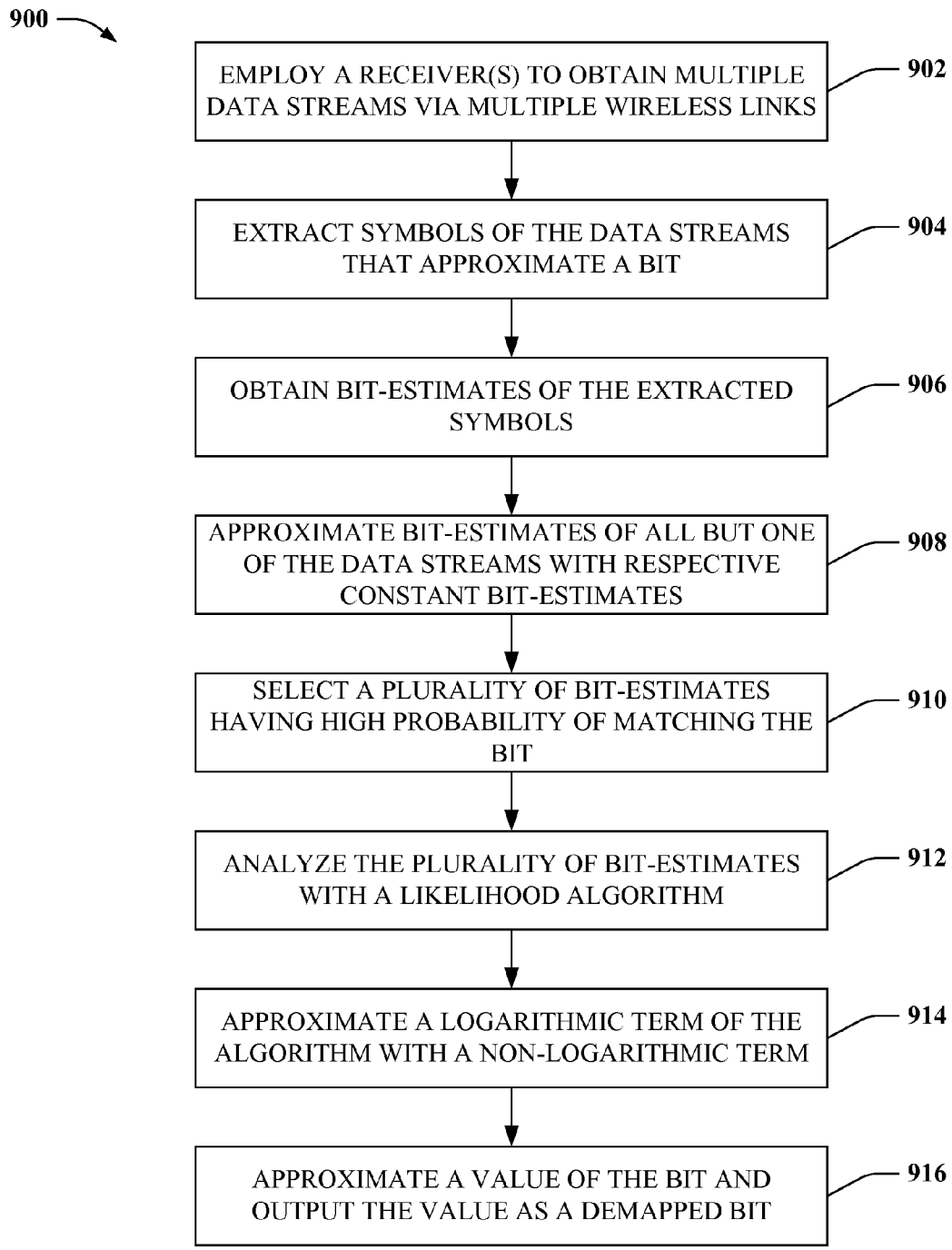
FIG. 9 illustrates a flowchart of a sample methodology for improved accuracy of multi-channel signal de-mapping according to further aspects.

In view of the exemplary systems described supra, methodologies that may be implemented in accordance with the disclosed subject matter will be better appreciated with reference to the flow charts of FIGS. 8-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 8 depicts a flowchart of an example methodology 800 according to aspects of the subject disclosure. In at least one example aspect, methodology 800 can comprise a method for MIMO wireless communication. Particularly, at 802, method 800 can comprise employing at least one wireless receiver to obtain multiple data streams via multiple wireless links. Particularly, the multiple data streams correspond to multiple transmit or receive versions of a single stream of electronic information. Once received, these respective transmit or receive versions are each distinct, as they are distorted by a unique wireless channel associated with the respective wireless links.

At 804, method 800 can comprise employing a data processor to de-map a bit of the multiple data streams by executing a likelihood algorithm. Particularly, the likelihood algorithm approximates the bit with a plurality of bit-estimates derived from a subset of the multiple data. Furthermore, the likelihood algorithm can also select the plurality of bit-estimates from those bit-estimates that have high probability of matching the bit. In one aspect of the subject disclosure, the plurality of bit-estimates comprises a first bit-estimate and a second bit-estimate of the bit, which have highest and second highest probability, respectively, of matching the bit. In addition, the bit-estimates can be derived from symbols of the subset that most closely approximate a sum of all data stream symbols that correspond with the bit.

According to one specific aspect of the subject disclosure, the plurality of bit-estimates is derived from fewer than all the data stream symbols that correspond with the bit. This aspect provides one mechanism for simplifying calculations involving in de-mapping the bit, by simplifying selection of the plurality of bit-estimates. In an additional aspect, method 800 can generate the fewer than all the data stream symbols by holding symbols of at least one data stream of the multiple data streams constant. In this manner, fewer than all data stream symbols are analyzed to derive the plurality of bit-estimates.

According to yet another aspect, at least one term of the likelihood algorithm determines the plurality of bit-estimates that most closely approximate the sum (of all data stream symbols) among one of the multiple data streams. Further, remaining terms of the likelihood algorithm determine additional pluralities of bit-estimates that most closely approximate the sum among other respective data streams. In this aspect, the plurality of bit-estimates and additional pluralities of bit-estimates each comprise two bit-estimates derived from a first data stream and a second data stream, respectively, of the multiple data streams. These pluralities of bit-estimates can then be employed to de-map the bit, for instance.

At 806, method 800 can comprise employing the data processor to output an approximation of the bit as a de-mapped bit. This de-mapped bit can then be decoded (e.g., by a decoder) to obtain a transmitted bit of information. In the described manner, method 800 can extract the transmitted bit of information from received wireless symbols that are distorted by unique channel conditions, including white noise. Further, method 800 can improve accuracy of de-mapping by employing a plurality of bit-estimates of the bit, while maintaining high processing speeds. This enables fast communication, while minimizing power consumption utilized for de-mapping the bit.

FIG. 9 illustrates a flowchart of a sample methodology 900 for de-mapping received wireless data according to still other aspects of the subject disclosure. At 902, method 900 can comprise employing a receiver(s) to obtain multiple data streams via multiple wireless links. At 904, method 900 can comprise extracting wireless symbols from the data streams that approximate a bit. At 906, method 900 can comprise obtaining bit-estimates of the extracted symbols. These bit-estimates can be derived, for instance, by utilizing a likelihood algorithm that determines a probability that the bit is in a particular state (e.g., a zero or a one). At 908, method 900 can comprise approximating bit-estimates of all but one of the data streams with respective constant bit-estimates. These respective constant bit-estimates can be derived from respective wireless symbols of the respective all but one of the data streams. For instance, a constant bit-estimate for a first of the data streams can be derived from an average of bit-estimates of the first of the data streams, a highest bit-estimate of the bit-estimates of the first of the data streams, or the like. As an alternative, the constant bit-estimates can be derived from default values. In addition to the foregoing, at 910, method 900 can comprise selecting a plurality of bit-estimates having high probability of matching the bit (e.g., that maximize a summation of bit-estimates associated with the bit).

At 912, method 900 can comprise analyzing the plurality of bit-estimates with a likelihood algorithm. At 914, method 900 can comprise approximating a logarithmic term of the likelihood algorithm that comprises the plurality of bit-estimates with a non-logarithmic factor. According to one aspect of the subject disclosure, approximating the logarithmic term further comprises employing a look-up table to provide values for the non-logarithmic correction factor. In an alternative aspect, approximating the logarithmic term further comprises employing a series expansion to provide values for the non-logarithmic correction factor instead. As one illustrative example, the logarithmic term is of the form $-a+\log(1+e^{a-b})$, where a and b are each bit-estimates of the bit. For instance, b can be the most correlated (e.g., highest) bit-estimate of the bit, and a can be a second most correlated (e.g., second highest) bit-estimate of the bit. In this example, it should be appreciated that the non-logarithmic correction factor can be indexed by a−b. This can provide a logical mechanism for obtaining values for the non-logarithmic correction factor (e.g., where a look-up table is utilized, based on values of a−b).

Further to the above, at 916, method 900 can comprise approximating a value of the bit. The approximation can be, for instance, based on the analysis of the bit-estimates at reference number 912, and approximating the logarithmic term at reference number 914. Once the value of the bit is obtained, the value is output as a de-mapped bit. This value can then be decoded for further processing.

Figure 10:
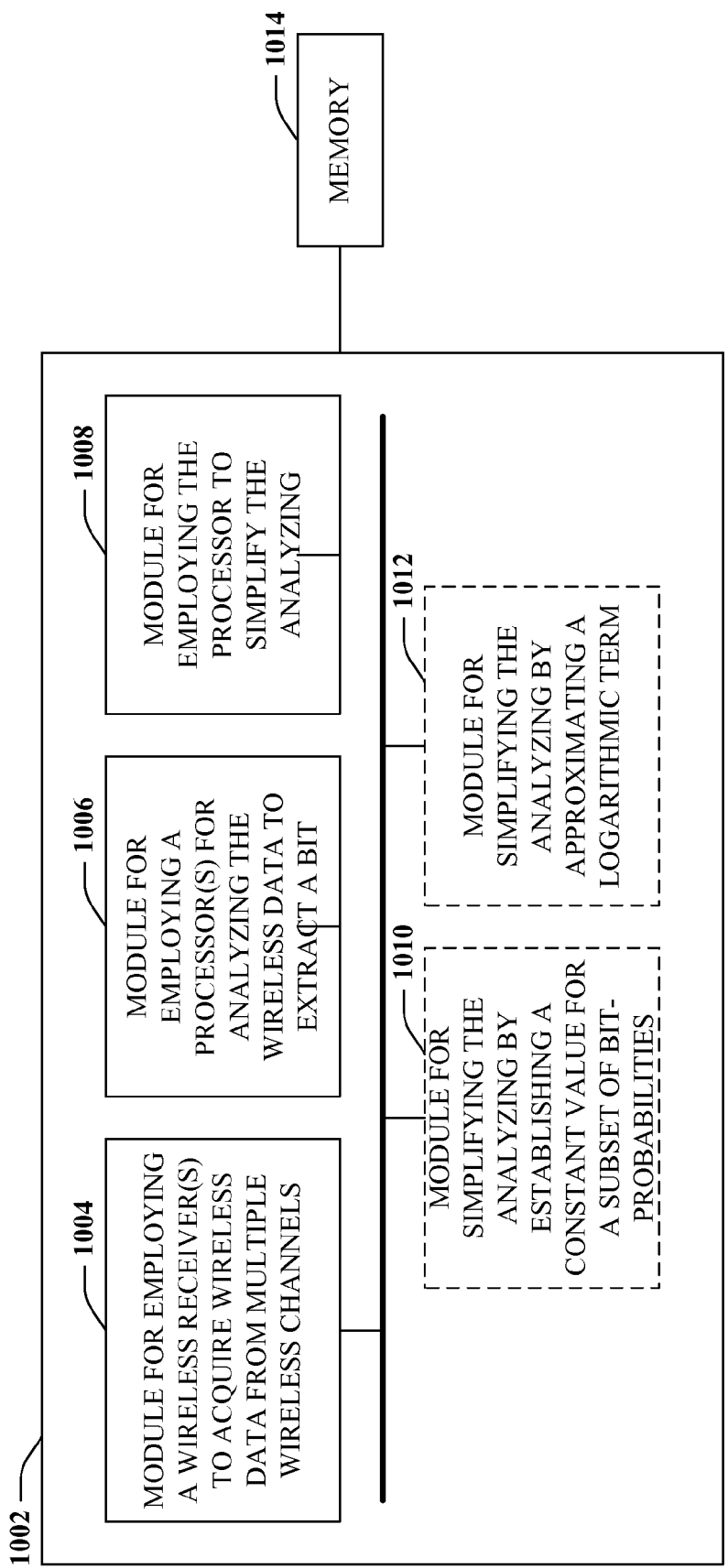
FIG. 10 illustrates a block diagram of an example system that improves signal de-mapping in a multi-channel wireless communication environment.

FIG. 10 illustrates an example system 1000 for implementing improved wireless signal de-mapping for multi-channel wireless communications according to aspects of the subject disclosure. For example, system 1000 can reside at least partially within a wireless communication network and/or within a wireless receiver such as a node, base station, access point, user terminal, personal computer coupled with a mobile interface card, or the like. It is to be appreciated that system 1000 is represented as including functional blocks, which can be functional blocks that represent functions implemented by a processor, software, or combination thereof (e.g., firmware).

System 1000 can comprise a memory 1002 for storing a set of modules configured to implement the multi-channel wireless communication. Furthermore, system 1000 can also comprise one or more processors 1014 for executing the set of modules. Specifically, the set of modules can comprise a module 1004 for employing one or more wireless receivers to acquire wireless data from multiple wireless channels. Further, it should be appreciated that the wireless data comprises a common stream of information that is transmitted or received via the multi-channel wireless communication. Additionally, the set of modules can comprise a module 1006 for employing at least one processor 1014 for analyzing the wireless data to extract a bit from the wireless data. Furthermore, the set of modules can comprise a module 1008 for employing the at least one processor 1014 to simplify the analyzing by substituting a plurality of bit-probabilities derived from the wireless data for a summation of a set of bit-probabilities associated with the bit. In a particular aspect, the plurality of bit-probabilities is less than all bit-probabilities associated with the bit. The bit-probabilities can be derived by utilizing a likelihood algorithm, configured to approximate the bit from the acquired wireless data. By employing the plurality of bit-probabilities, the likelihood algorithm is simplified while maintaining relatively high accuracy in de-mapping the bit.

The set of modules furthermore can optionally comprise a module 1010 for simplifying the analyzing by establishing a constant value for a subset of bit-probabilities of the set of bit-probabilities that are obtained from one of the multiple wireless channels. Additionally, module 1010 can provide for selecting the plurality of bit-probabilities from a reduced set of bit-probabilities comprising the constant value and comprising bit-probabilities derived from the multiple wireless channels other than the one of the multiple wireless channels. Another optional module 1012 can be employed for simplifying the analyzing by approximating a logarithmic term utilized for the analyzing with a non-logarithmic function. For instance, optional module 1012 can employ a look-up table for the non-logarithmic function, a series expansion (e.g., a Taylor series expansion) for the non-logarithmic function, a sum of suitable polynomial expressions for the non-logarithmic function, and so forth.

FIG. 11 depicts a block diagram of an example system 1100 that can facilitate wireless communication according to some aspects disclosed herein. On a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes (e.g., multiplexes) the data symbols and pilot symbols and provides a stream of symbols to a transmitter unit (TMTR) 1120. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105. Specifically, the uplink signal can be in accordance with SC-FDMA requirements and can include frequency hopping mechanisms as described herein.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and time-based impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1190 and 1150.

Figure 12:
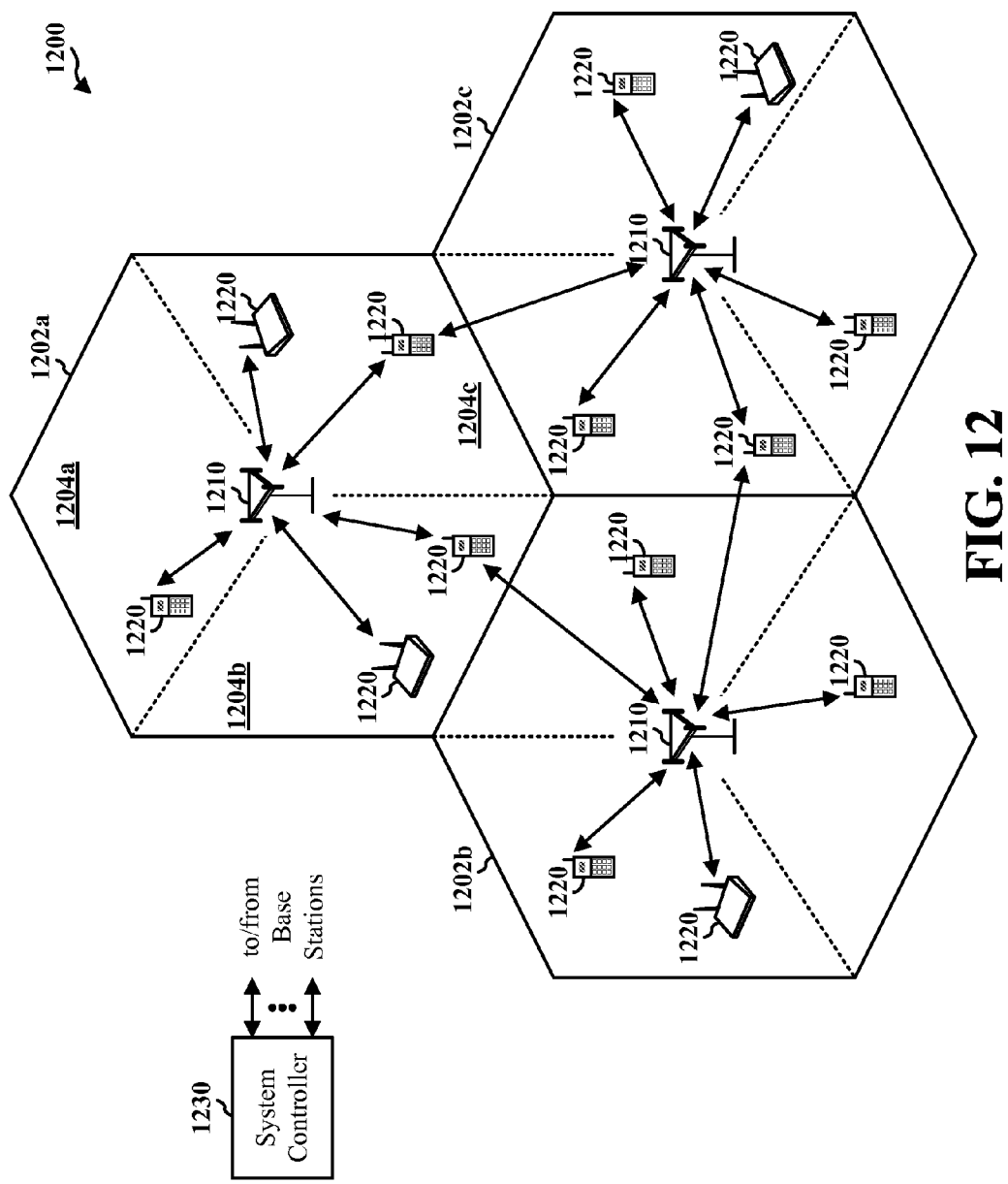
FIG. 12 illustrates a block diagram of an example cellular environment for wireless communications according to further aspects.

FIG. 12 illustrates a wireless communication system 1200 with multiple base stations (BSs) 1210 (e.g., wireless access points, wireless communication apparatus) and multiple terminals 1220 (e.g., ATs), such as can be utilized in conjunction with one or more aspects. A BS (1410) is generally a fixed station that communicates with the terminals and can also be called an access point, a Node B, or some other terminology. Each BS 1210 provides communication coverage for a particular geographic area or coverage area, illustrated as three geographic areas in FIG. 12, labeled 1202a, 1202b, and 1202c. The term "cell" can refer to a BS or its coverage area depending on the context in which the term is used. To improve system capacity, a BS geographic area/coverage area can be partitioned into multiple smaller areas (e.g., three smaller areas, according to cell 1202a in FIG. 12), 1204a, 1204b, and 1204c. Each smaller area (1404a, 1204b, 1204c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1220 are typically dispersed throughout the system, and each terminal 1220 can be fixed or mobile. Terminals 1220 can also be called a mobile station, user equipment, a user device, wireless communication apparatus, an access terminal, a user terminal or some other terminology. A terminal 1220 can be a wireless device, a cellular phone, a personal digital assistant (PDA), a wireless modem card, and so on. Each terminal 1220 can communicate with zero, one, or multiple BSs 1210 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1230 couples to base stations 1210 and provides coordination and control for BSs 1210. For a distributed architecture, BSs 1210 can communicate with one another as needed (e.g., by way of a wired or wireless backhaul network communicatively coupling the BSs 1210). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 13:
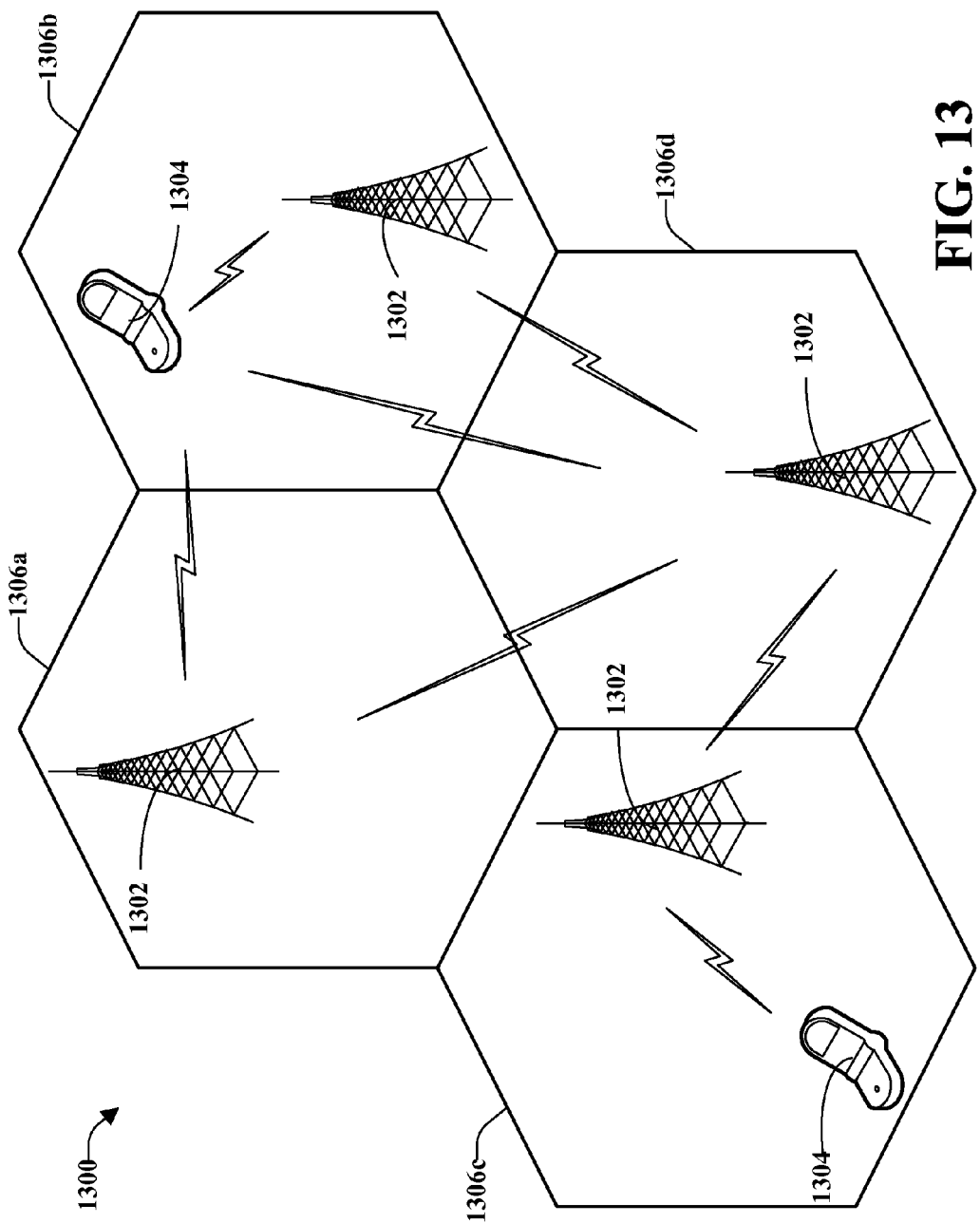
FIG. 13 depicts a block diagram of an example wireless signaling environment for wireless communications.

FIG. 13 is an illustration of a planned or semi-planned wireless communication environment 1300, in accordance with various aspects. System 1300 can comprise one or more BSs 1302 in one or more cells and/or sectors that receive, transmit, repeat, etc., wireless communication signals to each other and/or to one or more mobile devices 1304. As illustrated, each BS 1302 can provide communication coverage for a particular geographic area, illustrated as four geographic areas, labeled 1306a, 1306b, 1306c and 1306d. Each BS 1302 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 11), as will be appreciated by one skilled in the art. Mobile devices 1304 can be, for example, cellular phones, smart phones, laptops, handheld communication devices, handheld computing devices, satellite radios, global positioning systems, PDAs, or any other suitable device for communicating over wireless network 1300. System 1300 can be employed in conjunction with various aspects described herein in order to facilitate improved timing management in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive ... ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method comprising:
obtaining multiple data streams via multiple wireless links, the multiple data streams corresponding to multiple transmit or receive versions of a single stream of information;
de-mapping a bit of the multiple data streams by executing a likelihood algorithm, wherein the likelihood algorithm approximates the bit with a plurality of bit-estimates that most closely approximate the bit, wherein the plurality of bit-estimates are derived from fewer than all data stream symbols that correspond with the bit, and wherein one term of the likelihood algorithm determines a first plurality of bit-estimates used to most closely approximate a sum of all bit-estimates of one of the multiple data streams, and remaining terms of the likelihood algorithm determine additional pluralities of bit-estimates used to most closely approximate respective sums of all bit-estimates of other respective data streams; and
outputting an approximation of the bit as a de-mapped bit.

2. The method of claim 1, the plurality of bit-estimates comprises two bit-estimates of the bit.

3. The method of claim 1, wherein the bit-estimates of at least one data stream of the multiple data streams are set to a representative value selected from a largest bit-estimate value, an average bit-estimate value, a median bit-estimate value, and a predetermined constant value.

4. The method of claim 1, wherein the first plurality of bit-estimates and additional pluralities of bit-estimates each comprise two bit-estimates derived from a first data stream and a second data stream, respectively, of the multiple data streams.

5. The method of claim 1, further comprising approximating a logarithmic term of the likelihood algorithm that comprises the plurality of bit-estimates with a non-logarithmic correction factor.

6. The method of claim 5, further comprising determining values for the non-logarithmic correction factor using a look-up table.

7. The method of claim 5, further comprising determining values for the non-logarithmic correction factor using a series expansion.

8. The method of claim 5, wherein the logarithmic term is of a form $-a+\log(1+e^{b-a})$, where a and b are each bit-estimates of the bit.

9. The method of claim 5, wherein the non-logarithmic correction factor is indexed by b-a.

10. An apparatus comprising:
a wireless receiver configured to obtain multiple data streams via multiple wireless links, the multiple data streams corresponding to multiple transmit or receive versions of a single stream of information; and
a data processor configured to:
de-map a bit of the multiple data streams by executing a likelihood algorithm, wherein the likelihood algorithm approximates the bit with a plurality of bit-estimates that most closely approximate the bit, wherein the plurality of bit-estimates are derived from fewer than all data stream symbols that correspond with the bit, and wherein one term of the likelihood algorithm determines a first plurality of bit-estimates used to most closely approximate a sum of all bit-estimates of one of the multiple data streams, and remaining terms of the likelihood algorithm determine additional pluralities of bit-estimates used to most closely approximate respective sums of all bit-estimates of other respective data streams; and
output an approximation of the bit as a de-mapped bit.

11. The apparatus of claim 10, the plurality of bit-estimates comprises two bit-estimates of the bit.

12. The apparatus of claim 10, wherein the bit-estimates of at least one data stream of the multiple data streams are set to a representative value selected from a largest bit-estimate value, an average bit-estimate value, a median bit-estimate value, and a predetermined constant value.

13. The apparatus of claim 10, wherein the first plurality of bit-estimates and additional pluralities of bit-estimates each comprise two bit-estimates derived from a first data stream and a second data stream, respectively, of the multiple data streams.

14. The apparatus of claim 10, wherein the data processor is further configured to approximate a logarithmic term of the likelihood algorithm that comprises the plurality of bit-estimates with a non-logarithmic correction factor.

15. The apparatus of claim 14, wherein the data processor is further configured to determine values for the non-logarithmic correction factor using a look-up table.

16. The apparatus of claim 14, wherein the data processor is further configured to determine values for the non-logarithmic correction factor using a series expansion.

17. The apparatus of claim 14, wherein the logarithmic term is of a form $-a+\log(1+e^{b-a})$, where a and b are each bit-estimates of the bit.

18. The apparatus of claim 14, wherein the non-logarithmic correction factor is indexed by b-a.

19. An apparatus comprising:
means for obtaining multiple data streams via multiple wireless links, the multiple data streams corresponding to multiple transmit or receive versions of a single stream of information;
means for de-mapping a bit of the multiple data streams by executing a likelihood algorithm, wherein the likelihood algorithm approximates the bit with a plurality of bit-estimates that most closely approximate the bit, wherein the plurality of bit-estimates are derived from fewer than all data stream symbols that correspond with the bit, and wherein one term of the likelihood algorithm determines a first plurality of bit-estimates used to most closely approximate a sum of all bit-estimates of one of the multiple data streams, and remaining terms of the likelihood algorithm determine additional pluralities of bit-estimates used to most closely approximate respective sums of all bit-estimates of other respective data streams; and means for outputting an approximation of the bit as a de-mapped bit.

20. The apparatus of claim 19, wherein the bit-estimates of at least one data stream of the multiple data streams are set to a representative value selected from a largest bit-estimate value, an average bit-estimate value, a median bit-estimate value, and a predetermined constant value.

21. The apparatus of claim 19, wherein the first plurality of bit-estimates and additional pluralities of bit-estimates each comprise two bit-estimates derived from a first data stream and a second data stream, respectively, of the multiple data streams.

22. The apparatus of claim 19, further comprising means for approximating a logarithmic term of the likelihood algorithm that comprises the plurality of bit-estimates with a non-logarithmic correction factor.

23. A computer program product comprising:
a non-transitory computer-readable storage medium comprising:
  a first set of codes for causing a computer to obtain multiple data streams via multiple wireless links, the multiple data streams corresponding to multiple transmit or receive versions of a single stream of information;
  a second set of codes for causing the computer to de-map a bit of the multiple data streams by executing a likelihood algorithm, wherein the likelihood algorithm approximates the bit with a plurality of bit-estimates that most closely approximate the bit, wherein the plurality of bit-estimates are derived from fewer than all data stream symbols that correspond with the bit, and wherein one term of the likelihood algorithm determines a first plurality of bit-estimates used to most closely approximate a sum of all bit-estimates of one of the multiple data streams, and remaining terms of the likelihood algorithm determine additional pluralities of bit-estimates used to most closely approximate respective sums of all bit-estimates of other respective data streams; and
a third set of codes for causing the computer to output an approximation of the bit as a de-mapped bit.

* * * * *